(12) United States Patent
Theimer et al.

(10) Patent No.: US 7,089,323 B2
(45) Date of Patent: Aug. 8, 2006

(54) METHOD FOR MULTICASTING A MESSAGE ON A COMPUTER NETWORK

(75) Inventors: Marvin M. Theimer, Bellevue, WA (US); Michael B. Jones, Redmond, WA (US); Krishna P. Gummadi, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 569 days.

(21) Appl. No.: 10/177,335

(22) Filed: Jun. 21, 2002

(65) Prior Publication Data

US 2004/0006650 A1    Jan. 8, 2004

(51) Int. Cl.
C06F 15/173    (2006.01)
(52) U.S. Cl. ..................... 709/238; 709/243
(58) Field of Classification Search ............... 370/255, 370/218; 709/238–244, 200
See application file for complete search history.

(56) References Cited

U.S. PATENT DOCUMENTS

| | | | | |
|---|---|---|---|---|
| 5,331,637 | A * | 7/1994 | Francis et al. | 370/408 |
| 5,355,371 | A * | 10/1994 | Auerbach et al. | 370/255 |
| 5,721,914 | A | 2/1998 | DeVries | |
| 5,805,824 | A | 9/1998 | Kappe | |
| 5,831,975 | A * | 11/1998 | Chen et al. | 370/256 |
| 5,935,206 | A | 8/1999 | Dixon et al. | |
| 6,269,080 | B1 * | 7/2001 | Kumar | 370/236 |
| 6,505,254 | B1 | 1/2003 | Johnson et al. | |
| 6,553,413 | B1 | 4/2003 | Leighton et al. | |
| 6,584,075 | B1 * | 6/2003 | Gupta et al. | 370/256 |
| 6,735,200 | B1 * | 5/2004 | Novaes | 370/390 |
| 6,771,593 | B1 * | 8/2004 | Popovich | 370/218 |
| 2002/0010798 | A1 | 1/2002 | Shaul et al. | |
| 2002/0078174 | A1 | 6/2002 | Sim et al. | |
| 2002/0133491 | A1 | 9/2002 | Sim et al. | |
| 2003/0023505 | A1 | 1/2003 | Eglen et al. | |

OTHER PUBLICATIONS

Ratnasamy, et al., "Application-level Multicast Using Content-Addressable Networks," *Proceedings of Third International Workshop on Networked Group Communication* (NGC '01), 12 pgs (2001), printed at http://citeseer.lst.psu.edu/ratnasamy01applicationlevel.html.

Chankhunthod, A, et al., "A Hierarchical Internet Object Cache", Proceedings of USENIX 1996 Annual Technical Conference pp. 153-163, (Jan. 22-26, 1996).

* cited by examiner

*Primary Examiner*—William Thomson
*Assistant Examiner*—Diem Cao
(74) *Attorney, Agent, or Firm*—Wolf, Greenfield & Sacks, P.C.

(57) ABSTRACT

A method for multicasting a message in a computer network is described, in which at least some nodes of a multicast group transmit fault recovery information to other nodes of the group in addition to, or as part of, the message itself. The fault recovery information allows nodes to determine what dissemination responsibility should be assigned to successor nodes in the event that one or more nodes of the multicast group fail.

17 Claims, 15 Drawing Sheets

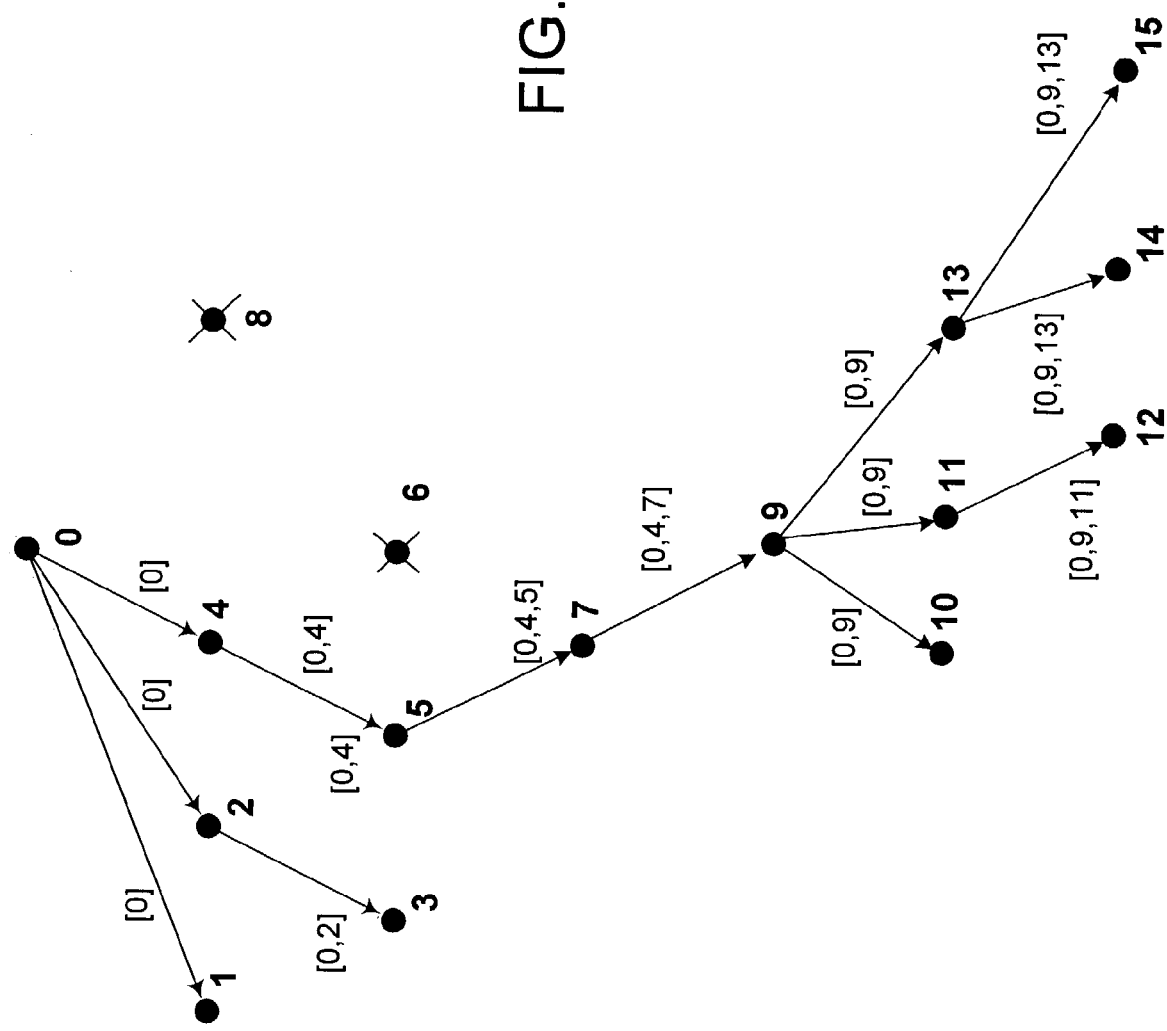

METHOD FOR MULTICASTING A MESSAGE ON A COMPUTER NETWORK

TECHNICAL FIELD

The present invention relates generally to network multicasting techniques and, more particularly, to multicasting techniques that enable recovery from node failures.

BACKGROUND OF THE INVENTION

Multicasting is, in general, a term used to characterize communication between a single sending node and multiple receiving nodes on a network. Multicasting is used for a variety of purposes, such as updating mobile corporate employees from a home office, or publishing online newsletters. Typically, the receiving nodes are all members of a predefined multicast group.

Many multicasting techniques rely on the use of a multicast tree to disseminate a multicast message among the members of a group. A multicast tree is a communication topology in which the sender of the multicast message transmits the message to a subset of the nodes in the group. Each of the nodes that receives the message then forwards copies of the message to a second subset of nodes in the group. The second subset repeats this process, and so on, until the message reaches all of the members of the multicast group.

One of the challenges faced when multicasting a message via a multicast tree is how to recover from the failure of nodes in the tree. Because of the pyramidal structure of a multicast tree, the failure of even a single node to forward the multicast message can prevent many other nodes from receiving it.

SUMMARY OF THE INVENTION

The invention is generally directed to a method for multicasting a message in a computer network, in which at least some nodes of a multicast group transmit fault recovery information to other nodes of the group in addition to, or as part of, the message itself. The fault recovery information allows nodes to determine what dissemination responsibility should be assigned to successor nodes in the event that one or more nodes of the multicast group fail. According to the invention, the message is transmitted from a "root" node to a plurality of recipient nodes, each of which represents a subset of the group of nodes that is intended to receive the message, such that the combined members of the represented subsets equal the whole group. Along with, or as part of the message, the root node transmits fault recovery information to at least some of the recipient nodes. The fault recovery information includes data such as the identity of nodes in the multicast group for which the recipient node is responsible and the identity of nodes in the multicast group for which nodes other than the recipient node are responsible. After receiving the message from the root node, each of the plurality of recipient nodes, in turn, sends the message and, where appropriate, fault recovery information to other nodes. This process continues recursively until nodes receiving the message and the fault recovery information no longer have other nodes to which they need to send the message and the fault recovery information.

Additional features, and advantages of the invention will be made apparent from the following detailed description of illustrative embodiments that proceeds with reference to the accompanying figures.

BRIEF DESCRIPTION OF THE DRAWINGS

While the appended claims set forth the features of the present invention with particularity, the invention, together with its objects and advantages, may be best understood from the following detailed description taken in conjunction with the accompanying drawings of which:

FIG. 4 illustrates an example of how a multicast tree would look if Node 3 multicast a message to the multicast group of FIG. 3a;

FIG. 13 illustrates an example of how a Full Path Information embodiment of the invention handles the failure of multiple nodes.

DETAILED DESCRIPTION OF THE INVENTION

Prior to proceeding with a description of the various embodiments of the invention, a description of the computer and networking environment in which the invention may be practiced will now be provided. Although it is not required, the present invention may be implemented by program modules that are executed by one or more computers. Generally, program modules include routines, objects, components, data structures and the like that perform particular tasks or implement particular abstract data types. The term "program" as used herein may connote a single program module or multiple program modules acting in concert. The invention may be implemented on a variety of types of computers, including personal computers (PCs), hand-held devices, multi-processor systems, microprocessor-based programmable consumer electronics, network PCs, minicomputers, mainframe computers and the like. The invention may also be employed in distributed computing environments, where tasks are performed by remote processing devices that are linked through a communications network. In a distributed computing environment, modules may be located in both local and remote memory storage devices.

Figure 1:
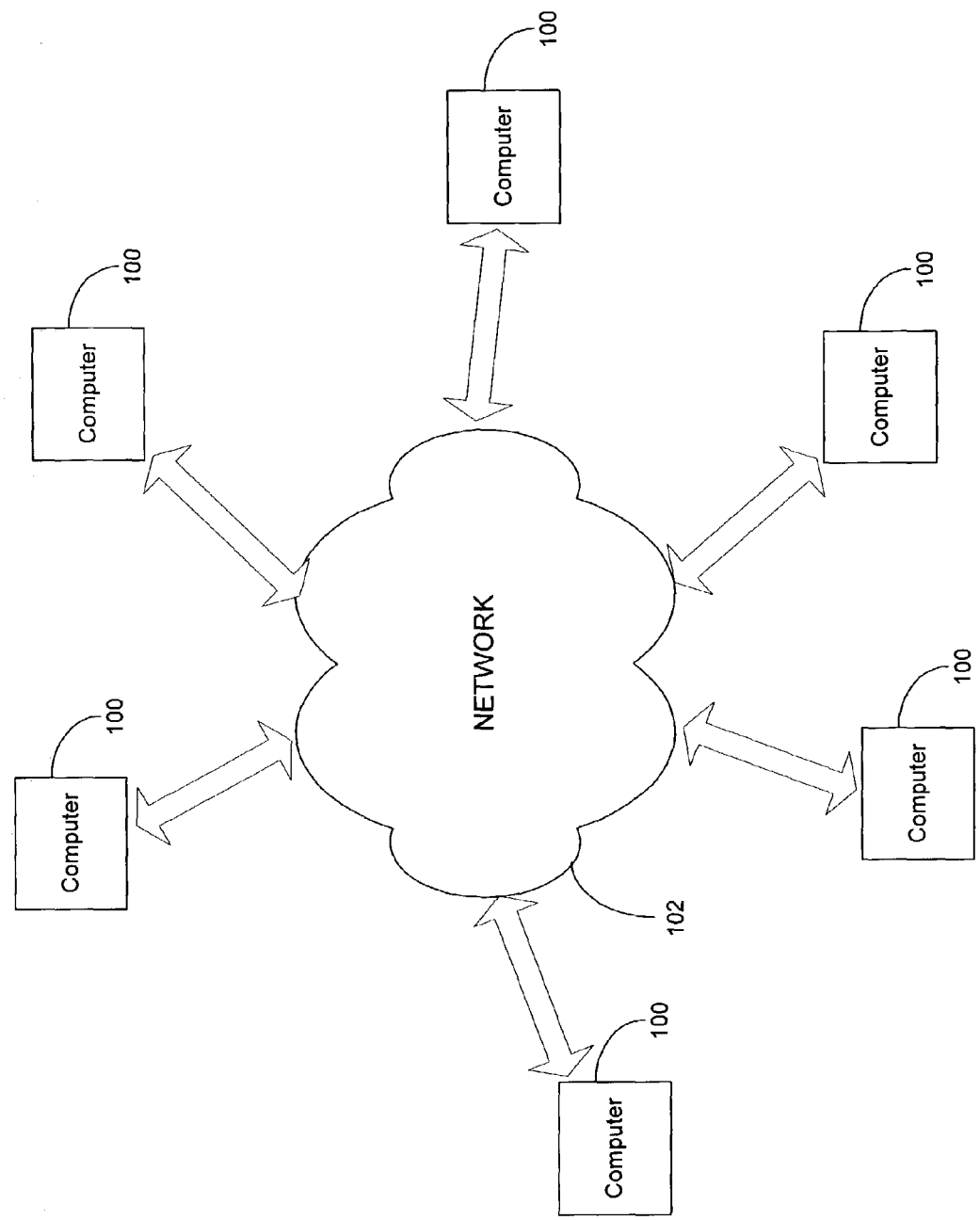
FIG. 1 shows an example of a computer network in which the invention may be practiced.

An example of a networked environment in which the invention may be used will now be described with reference to FIG. 1. The example network includes several computers 100 communicating with one another over a network 102, represented by a cloud. Network 102 may include many well-known components, such as routers, gateways, hubs, etc. and may allow the computers 100 to communicate via wired and/or wireless media.

Figure 2:
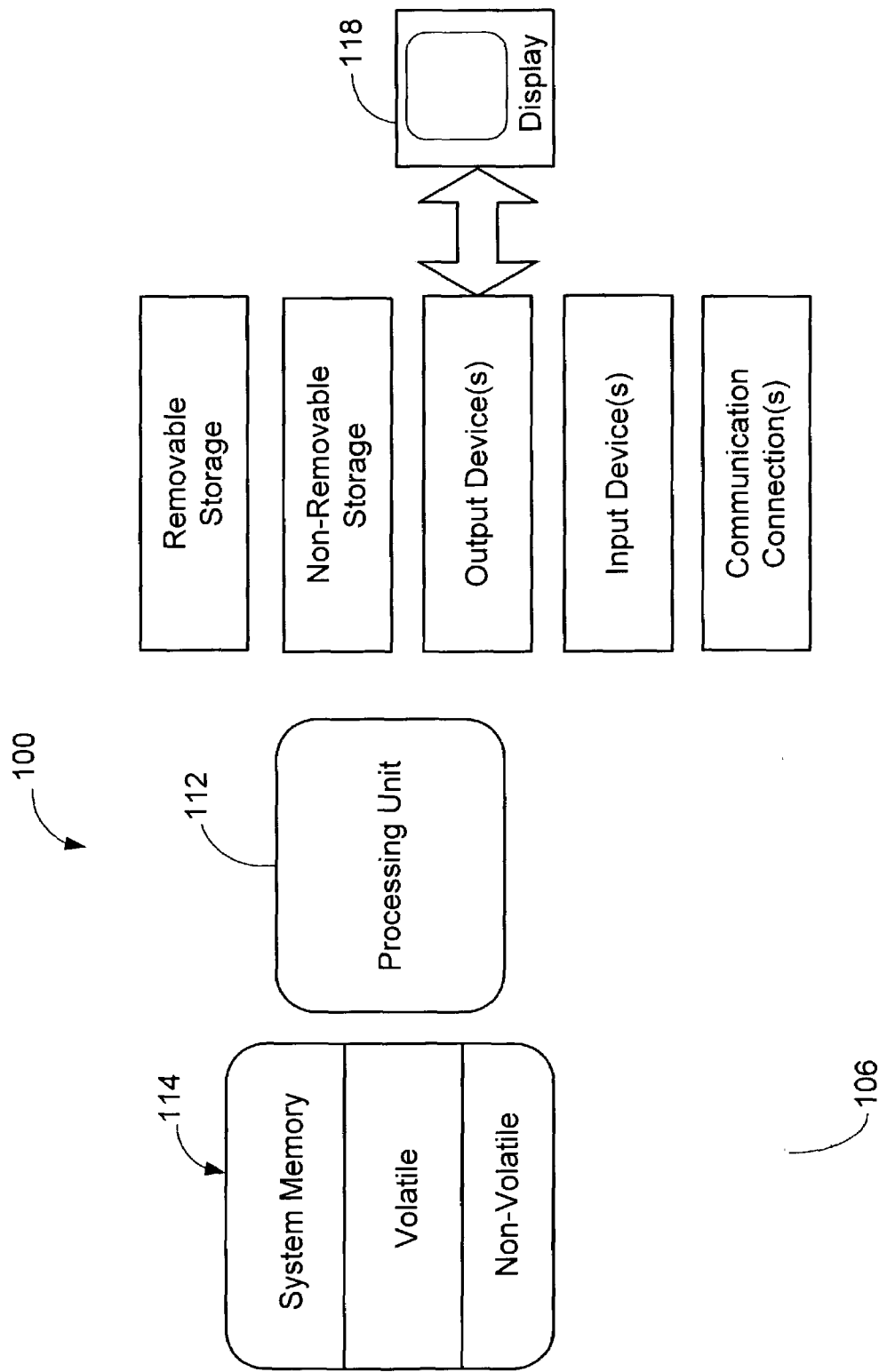
FIG. 2 shows an example of a computer on which at least some parts of the invention may be implemented.

Referring to FIG. 2, an example of a basic configuration for a computer on which the system described herein may be implemented is shown. In its most basic configuration, the computer 100 typically includes at least one processing unit 112 and memory 114. Depending on the exact configuration and type of the computer 100, the memory 114 may be volatile (such as RAM), non-volatile (such as ROM or flash memory) or some combination of the two. This most basic configuration is illustrated in FIG. 2 by dashed line 106. Additionally, the computer may also have additional features/functionality. For example, computer 100 may also include additional storage (removable and/or non-removable) including, but not limited to, magnetic or optical disks or tape. Computer storage media includes volatile and non-volatile, removable and non-removable media implemented in any method or technology for storage of information such as computer readable instructions, computer executable instruction, data structures, program modules, or other data. Computer storage media includes, but is not limited to, RAM, ROM, EEPROM, flash memory or other memory technology, CD-ROM, digital versatile disk (DVD) or other optical storage, magnetic cassettes, magnetic tape, magnetic disk storage or other magnetic storage devices, or any other medium which can be used to stored the desired information and which can be accessed by the computer 100. Any such computer storage media may be part of computer 100.

Computer 100 may also contain communications connections that allow the device to communicate with other devices. A communication connection is an example of a communication medium. Communication media typically embodies computer executable instructions, computer readable instructions, data structures, program modules or other data in a modulated data signal such as a carrier wave or other transport mechanism and includes any information delivery media. By way of example, and not limitation, communication media includes wired media such as a wired network or direct-wired connection, and wireless media such as acoustic, RF, infrared and other wireless media. The term computer readable media as used herein includes both storage media and communication media.

Computer 100 may also have input devices such as a keyboard, mouse, pen, voice input device, touch input device, etc. Output devices such as a display 118, speakers, a printer, etc. may also be included. All these devices are well known in the art and need not be discussed at length here.

Figure 3A:
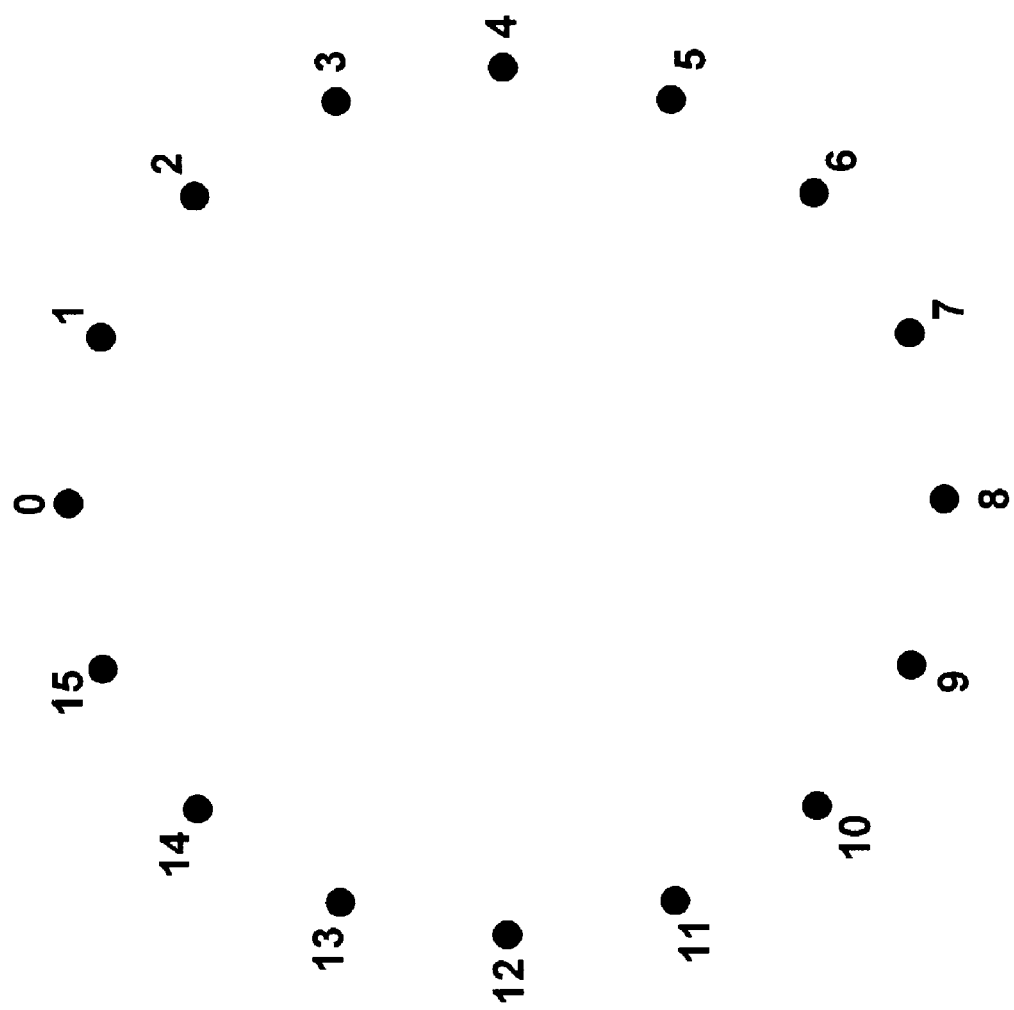
FIG. 3a illustrates an example how nodes of a multicast group are ordered in a circular fashion according to an embodiment of the invention.

A description of how nodes of a computer network are organized into a multicast group according to certain embodiments of the invention will now be provided. Referring to FIG. 3a, an example computer network has 16 nodes, which are numbered consecutively from zero to $2^4$ or 16. Any number of nodes is possible, however, and the node numbers need not be consecutive. The node numbers will also be referred to herein as "Node IDs." For the sake of illustrating the invention, each of the nodes in the computer network of FIG. 3a is assumed to be a member of a single multicast group. However, this need not be the case and, in fact, there may be hundreds or thousands of nodes in the network, with many, many multicast groups, each group including a subset of the total number of nodes in the computer network.

The nodes of the example computer network of FIG. 3a all operate in the context of an overlay network. That is, there is a routing topology among the nodes that exists and operates on top of an underlying routing topology (e.g. IP routing). There are a variety of possible overlay topologies that may be used. An example of such an overlay topology is CHORD, which is described in the proceedings of SIGCOMM'01, Aug. 27–31, 2001.

Referring again to FIG. 3a, the nodes of the example computer network are shown as being arranged in a circular fashion. Note that this circle of nodes is meant only to be a logical representation, and is not meant to imply any particular physical arrangement. In other words, the actual devices that make up each node can be in any physical configuration and, in many cases, will be located at great distances from one another. For example, Nodes 0 and 5 may be located in Seattle, while Nodes 2 and 6 may be located in Chicago. The circular representation in FIG. 3a is only meant to show that the node numbering system in certain embodiments of the invention is circular in many respects.

Referring again to FIG. 3a, many of the nodes in the multicast group are responsible for forwarding multicast messages to other nodes of the group. Nodes with such responsibility will be referred to herein as "parent" nodes, while the nodes receiving messages from the parent nodes will be referred to as "child" nodes. It is to be understood that a node may simultaneously be a parent and a child node. Each node maintains a routing table, referred to herein as a "finger pointer table," that contains entries, referred to herein as "finger pointers." Each finger pointer points to some other node in the multicast group. The other nodes pointed to by the finger pointers in a given node's finger pointer table conform generally to the following pattern: given a multicast group of S nodes, and given that $p=\log_2(S)$, each Node n (i.e. each node that is numbered some arbitrary number n) has finger pointers to Node $[(n+S/2^p) \mod S]$ Node $\{[n+S/(2^{p-1})] \mod S\}$, Node $\{[n+S/(2^{p-2})] \mod S\}$ . . . , and Node $[(n+S/2) \mod S]$. For example, in a 16-node multicast group (as shown in FIG. 3a), the entries in the finger pointer table maintained on Node 0 contains pointers to Nodes 1, 2, 4 and 8. The entries in the finger pointer table maintained on Node 4 would contain pointers to Nodes 5, 6, 8 and 12. The entries in the finger pointer table maintained by Node 10, contain pointers to Nodes 11, 12, 14 and 2. Finally, the entries in the finger pointer table maintained by Node 15 contain pointers to Nodes 0, 1, 3 and 7.

According to various embodiments of the invention, certain nodes of a multicast group are assigned a range (in terms of Node IDs) of nodes to which they are responsible for delivering a multicast message and for delivering data regarding the range of nodes to which the receiving nodes themselves are responsible for delivering the message. A node receiving the message and the data uses its finger table to pick a set of child nodes that will, in turn, be assigned subsets of the range for which the receiving node is responsible. The receiving node then forwards the message to the child nodes along with data regarding each child node's respective range of responsibility. The process for determining which subset of nodes each child node is responsible for is generally as follows: given each relevant node that is pointed to by an entry in the finger table, that child node is responsible for delivering the message to all nodes in a range up to, but not including, the node pointed to by the subsequent entry in the finger table. Note that only those nodes that fall within the range of the responsibility of the parent node get chosen to become child nodes.

Figure 3B:
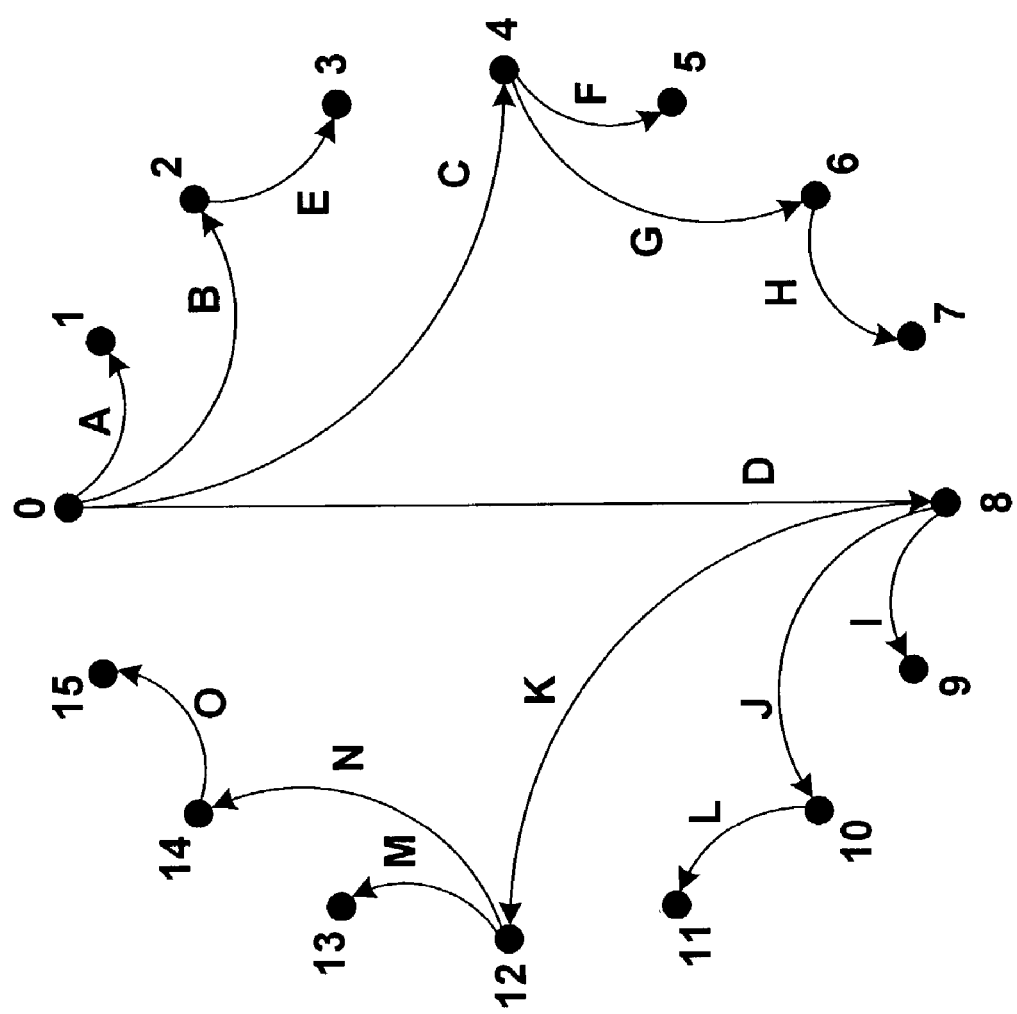
FIGS. 3b–3c illustrate an example of how rules for assigning responsibility of child nodes to parent nodes are implemented according to an embodiment of the invention.
Figure 3C:
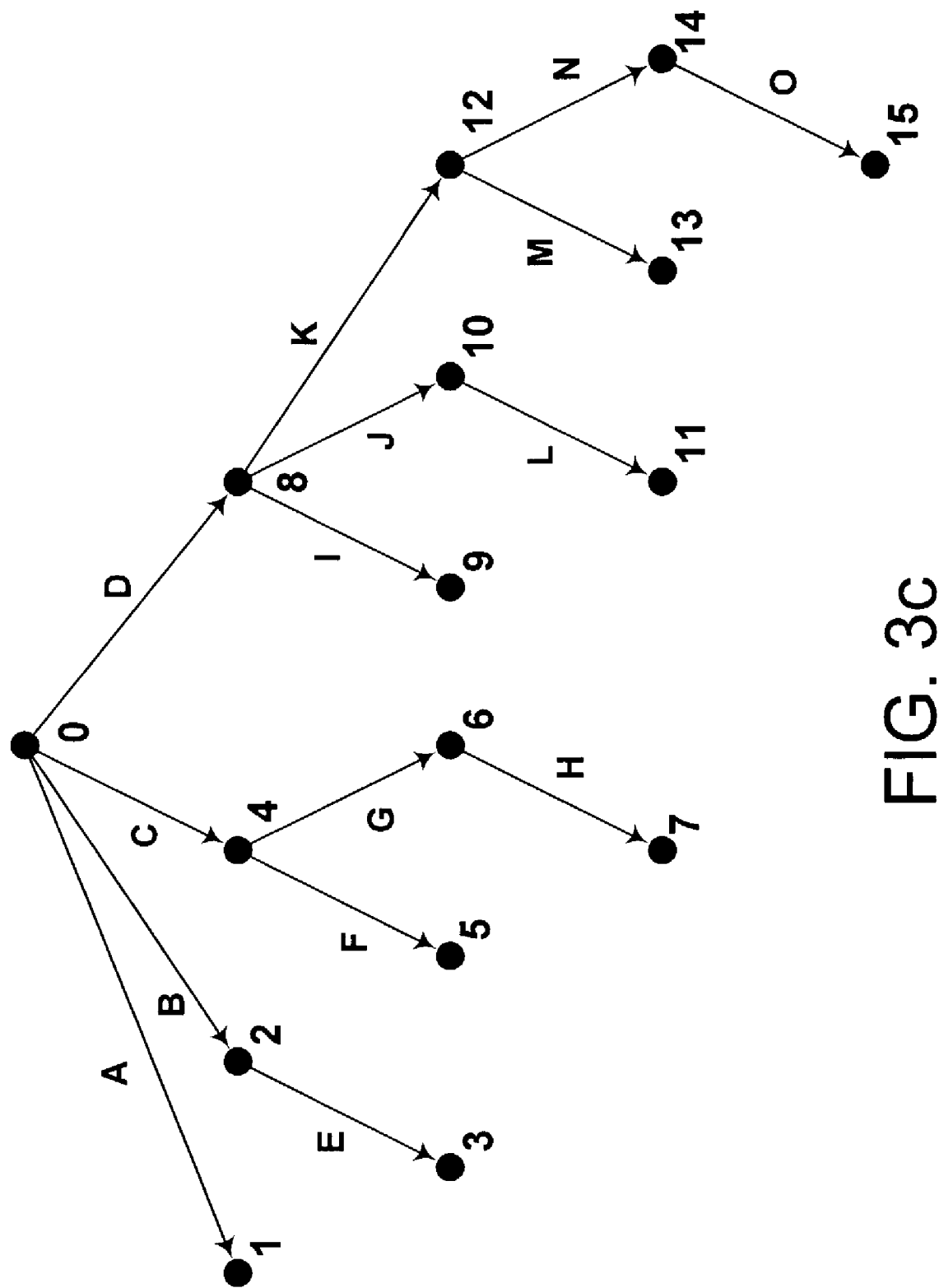

Referring to FIGS. 3b–3c, an example of how the above-described rules for assigning responsibility of child nodes to parent nodes according to an embodiment of the invention will now be described. The process begins at Node 0, which, according to the above-mentioned process, has Nodes 1, 2, 4 and 8 as its child nodes (Arrows A, B, C and D).

The responsibility for forwarding multicast messages among Node 0's children is divided as follows: Node 1 is only responsible for delivering multicast messages to itself. Node 2 is responsible for itself and Node 3. Node 4 is responsible for itself and Nodes 5, 6 and 7. Finally, Node 8 is responsible for itself and Nodes 9, 10, 11, 12, 13, 14 and 15. Node 8's area of responsibility has an "upper" boundary at Node 0. Node 4's area of responsibility is subdivided between Nodes 5 and 6 (Arrows F and G). Node 5 is only responsible for itself and does not need any further subdivision of its area of responsibility. Node 6 is responsible for itself and Node 7. Node 8's area of responsibility is subdivided among Nodes 9, 10 and 12 (Arrows I, J and K). Node 9 is responsible only for itself. Node 10 is responsible for itself and Node 11 (Arrow L). Node 12 is responsible for itself and Nodes 13, 14 and 15. Node 12's area of responsibility is subdivided among Nodes 13 and 14 (Arrows M and N). Node 13 is responsible only for itself. Node 14 is responsible for itself and Node 15 (Arrow O). When conceptualized as a tree, the forwarding topology of FIG. 3b looks like the multicast tree shown in FIG. 3c.

Figure 4:
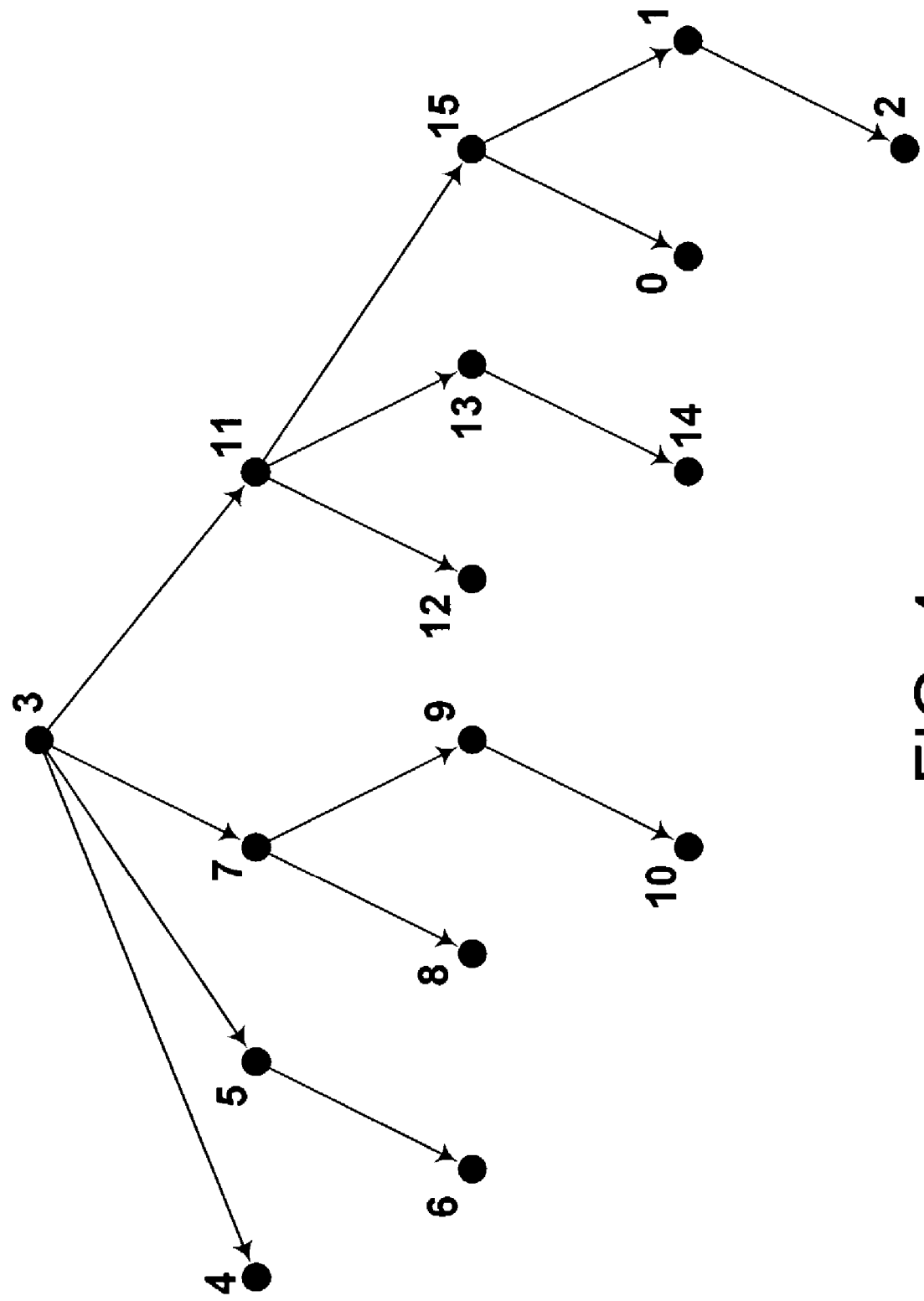

Although the examples shown heretofore have assumed that Node 0 is the originating node, any of the nodes of the multicast group may be the originator. For example, if Node 3 multicasts a message to the group of FIG. 3a, the resulting multicast tree would resemble the one shown in FIG. 4.

Four general methods of enabling nodes of a multicast group to overcome failures will now be described. Each of these methods may be practiced according to many different embodiments of the invention and implemented with many different variations. Each method will be referred to with a different name to facilitate the description. The four general methods are as follows: (1) Copy-N-Deep, (2) Overlapping-N, (3) Verify Rightward and (4) Full-Path Information. The examples that follow help illustrate these four general methods. Although these methods are described in the context of a CHORD-configured overlay network, they may be applied to other types of overlay networks as well.

Copy-N-Deep

According to various embodiments of the invention that use the Copy-N-Deep method, each node in the multicast group is prepared to redo its work until it has determined that the relevant subtasks have been performed at N levels further down in the multicast tree. That is, when a node receives a multicast message, it delivers it locally and then forwards it down the multicast tree to its children. Along with, or as part of the message, is information that indicates what the responsibility of a recipient node is with respect to ensuring that copies of the message are delivered to other nodes. A recipient node may delegate this responsibility to its child nodes, if it has any. It then waits to hear acknowledgement messages from its children indicating that they have successfully gotten the message and acted on it to various levels further down the tree. In this manner the information needed to redo each piece of forwarding work—also referred to as the "failure recovery information"—is effectively stored on N nodes down the tree. For example, the Copy-1-Deep method of facilitating failure recovery allows for single nodes to fail in each delivery delegation path because the second reply is not received until the failure recovery information is in at least two places: at the child node and at the children of the child node. As a result, the child node can fail without preventing the multicast message from being propagated down the tree below the child node.

This method can be extended to handle any N faults by passing the failure recovery information with the message to each node and only returning a final reply once the child nodes indicate that they have recursively contacted their children to a depth of N levels. This entails N+1 replies to each message. Each reply may include: an ack, a reply saying that the node has contacted its immediate children, and a reply saying that the node's children have contacted their children, . . . and so on, up to a reply saying that N levels of children below the node's children have the failure recovery information.

Figure 5:
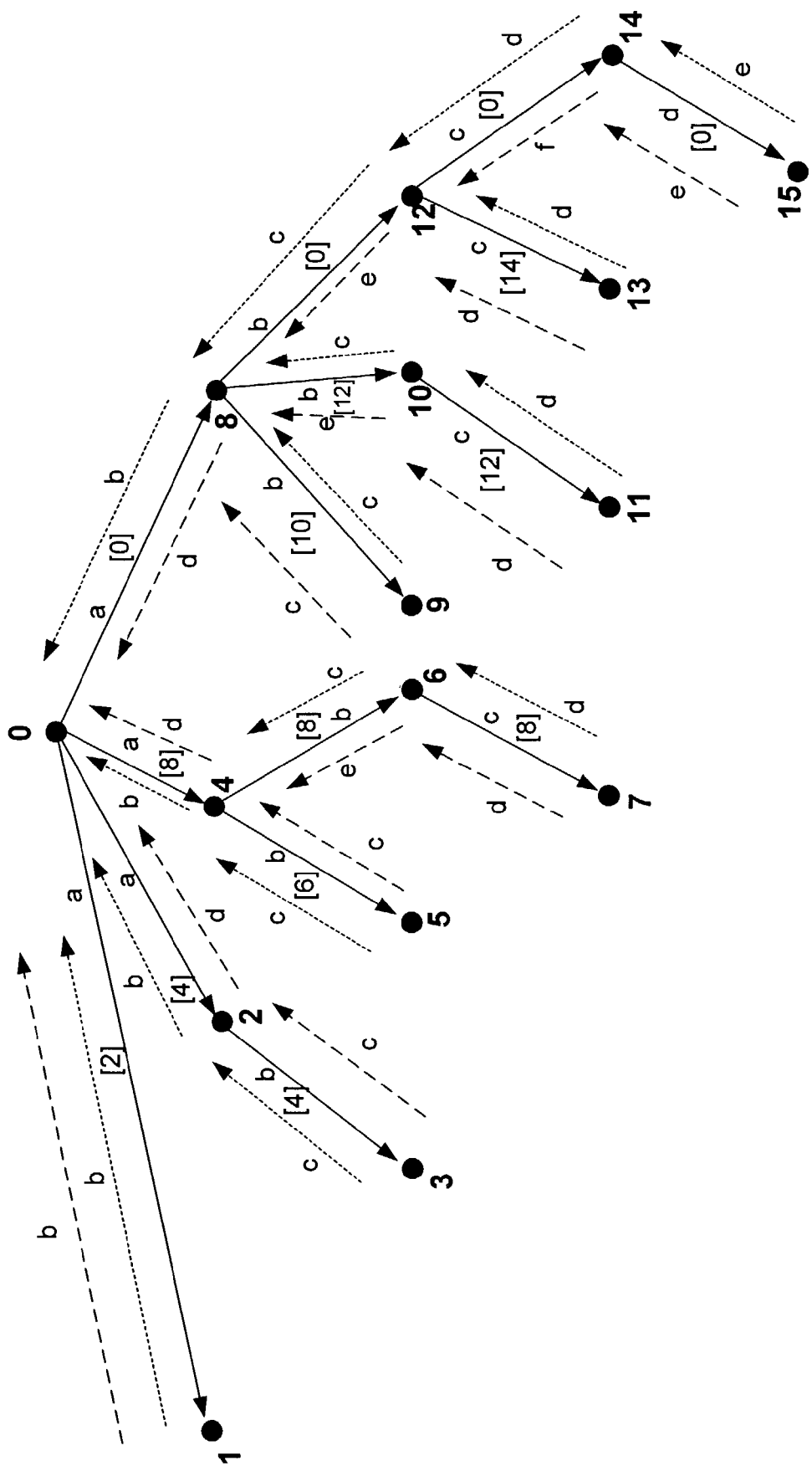
FIG. 5 illustrates an example of how the Copy-N-Deep method is implemented with N=1 and using the multicast group of FIGS. 3a–3b.

Referring to FIG. 5, the Copy-N-Deep method will be illustrated using the multicast tree introduced in FIG. 3c. In this example, it is assumed that N=1 and that Node 0 is the originator of the message. Note that the solid lines indicate tagged messages being sent down the tree, the short-dashed lines indicate message receipt acknowledgements, and the long-dashed lines indicate confirmations that nodes generate when they have successfully sent copies of the message to the next N levels of nodes (one level, in this example). At time a (FIG. 5), the following events occur: Node 0 transmits a copy of the message to each of its child nodes—that is, Nodes 1, 2, 4 and 8. Accompanying each copy is a tag that includes the rightmost boundary of the area for which the recipient node is responsible. The area of responsibility excludes the rightmost boundary itself. In this example, the copy of the message received by Node 1 includes the tag [2], indicating that Node 1 is responsible for ensuring that copies of the message are delivered to all nodes that lie between itself and Node 2, excluding Node 2. In other words, Node 1 is only responsible for delivering the message to itself. Node 2 receives a copy of the message that includes the tag [4], indicating that Node 2 is responsible for ensuring that copies of the message are delivered to all nodes between itself and Node 4, excluding Node 4. Thus, Node 2 is responsible for delivering a copy of the message to itself and Node 3. Node 4 receives a copy of the message that includes the tag [8], indicating that Node 4 is responsible for ensuring that a copies of the message are delivered to all nodes between itself and Node 8, excluding Node 8. Thus, Node 4 is responsible for ensuring that a copy of the message is delivered to itself and to Nodes 5, 6 and 7. Finally, Node 8 receives a copy of the message that includes the tag [0], indicating that it is responsible for ensuring that the message is sent to all nodes between itself and Node 0, excluding Node 0. Thus, Node 8 is responsible for delivering the message to itself, and to Nodes 9, 10, 11, 12, 13, 14 and 15.

At time b, the following events occur. Nodes 1, 2, 4 and 8 each send an acknowledgement back to Node 0, indicating that they have received their respective messages. Node 1 also sends a confirmation to Node 0, indicating that it has fulfilled all of its forwarding responsibilities (it has none, so the confirmation is immediate). Node 2 sends a copy of the message to Node 3 along with the tag [4]. Similarly, Node 4 sends a copy of the message to Node 5 that includes the tag [6], and sends another copy of the message to Node 6 that includes the tag [8]. Finally, Node 8 sends a copy of the message to each of Nodes 9, 10 and 12, which includes the tags [10], [12] and [0] respectively.

At time c, the following events occur: Nodes 3, 5, 6, 9, 10 and 12 each send acknowledgement messages to their respective parent nodes indicating that they've received their respective messages. Nodes 3, 4 and 9 also send confirmation messages back to Node 0, indicating that they have fulfilled their respective forwarding responsibilities (they have none, so the confirmations are immediate). Node 6 forwards a copy of the message that includes the tag [8] to Node 7. Node 10 forwards a copy of the message that includes the tag [12] to Node 11. Finally, Node 12 forwards a copy of the message that includes the tag [14] to Node 13, and forwards a copy of the message that includes the tag [0] to Node 14.

At time d, the following events occur: Nodes 7, 11, 13 and 14 each send acknowledgement messages to their respective parent nodes indicating that they've received their respective messages. Nodes 2, 4 and 8 send confirmation messages back to Node 0, indicating that they have successfully sent copies of the message down to one level of child nodes within their region of responsibility. Nodes 7, 11 and 13 also send confirmation messages back to their respective parent nodes, indicating that they have fulfilled their respective forwarding responsibilities (they have none, so the confirmations are immediate). Finally, Node 14 sends a copy of the message that includes the tag [0] to Node 15.

At time e, Nodes 6, 10 and 12 send confirmation messages back to their respective parent nodes, indicating that they have successfully sent copies of the message down to one level of child nodes within their region of responsibility. Node 15 sends an acknowledgement message to its parent node, Node 14, indicating that it has received the tagged copy of the message. Node 15 also sends a confirmation message back to Node 14, indicating that it has fulfilled its forwarding responsibilities (it has none, so the confirmation is immediate). Finally, at time f, Node 14 sends a confirmation message back to Node 12, indicating that it has successfully sent the message down to the next level of nodes (i.e. Node 15).

Figure 6:
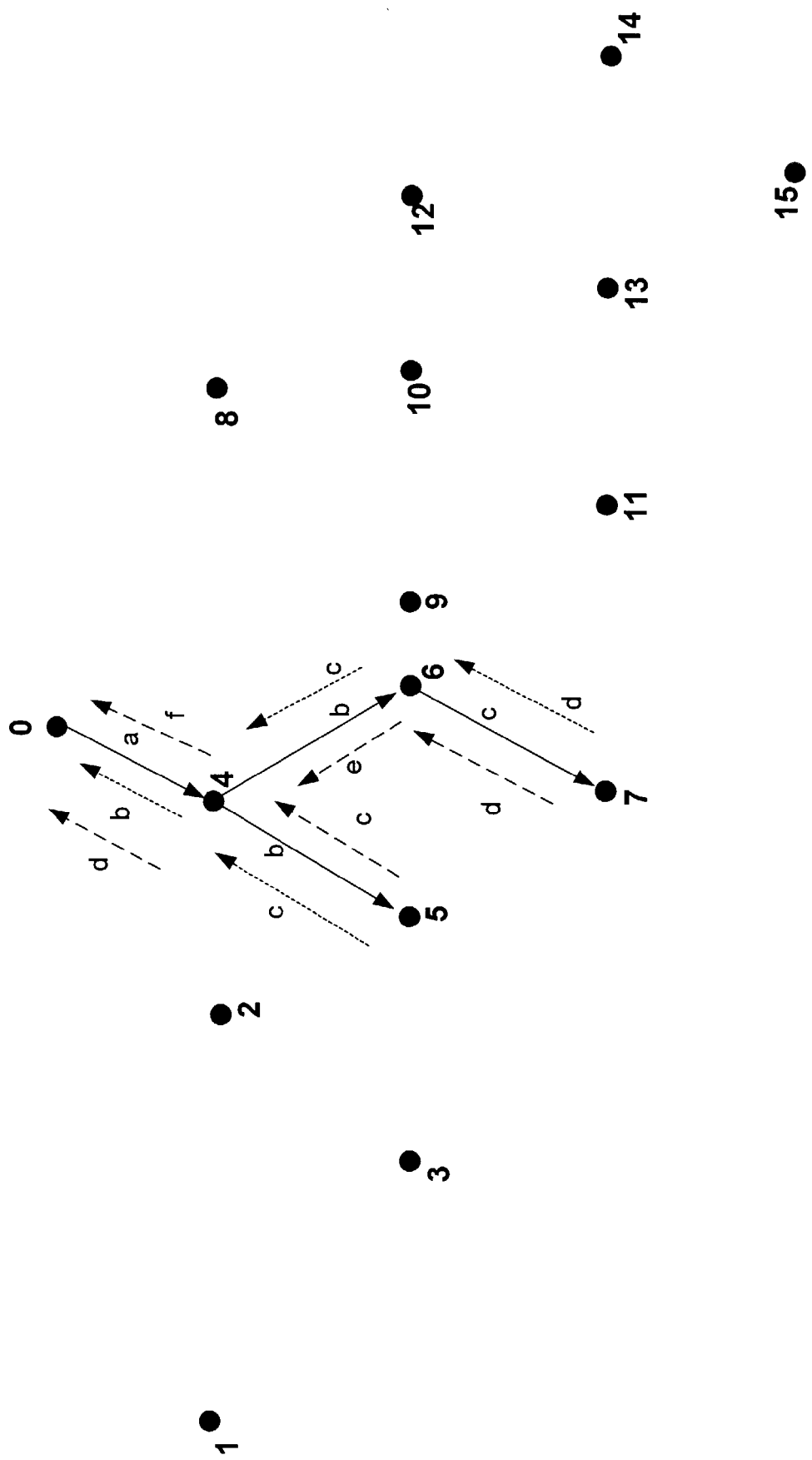
FIG. 6 illustrates an example of how the Copy-N-Deep method is implemented where N=2.

Referring to FIG. 6, an example of how the Copy-N-Deep method is implemented where N=2 will now be described. Reference to the tags sent to each node is omitted, but the content of the tags is essentially the same as the tags shown and described in FIG. 5, where N=1. The main difference between an N=1 implementation and an N=2 implementation is how many levels of confirmations are required for a node to verify that its child nodes have done their respective jobs. Additionally, only a few of the message paths will be described, as the general concepts are the same as in the implementations of Copy-N-Deep that have already been discussed. At time a, (FIG. 6) Node 0 sends a multicast message to Node 4. At time b, Node 4 acknowledges receipt of the message, and forwards a copy of the message to Nodes 5 and 6. At time c, Nodes 5 and 6 send acknowledgements to Node 4, indicating that they have received their messages. Node 5 also sends a confirmation to Node 4, indicating that it has fulfilled its forwarding responsibilities.

Also, Node 6 forwards a copy of the message to Node 7. At time d, Node 7 sends an acknowledgement to Node 6, indicating that it has received the message, as well as a confirmation that it has fulfilled its forwarding responsibilities. Also, Node 4 sends a confirmation to 0 indicating that it successfully sent copies of the message to its immediate children. At time e, Node 6 sends a confirmation to Node 4, indicating that it has successfully sent copies of the message to its children (there is only one level of children below Node 6). Finally, at time f, Node 4 sends a confirmation message to Node 0 indicating that it has successfully sent copies of the message to its children two levels down.

Figure 7:
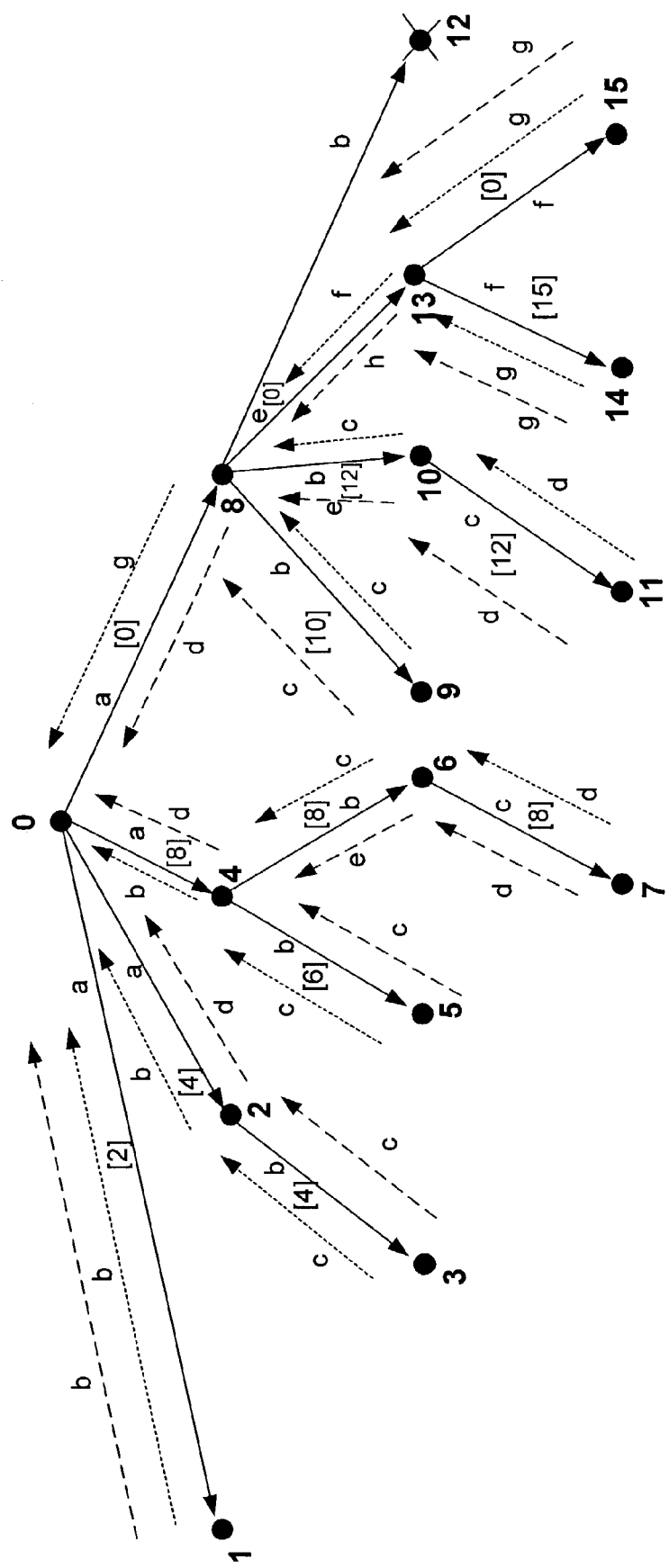
FIG. 7 illustrates an example of how a multicast group operating according to various embodiments of the invention handles a single node failure using the Copy-N-Deep method, where N=1.

An example of how a multicast group operating according to various embodiments of the invention handles a single node failure using the Copy-N-Deep method, where N=1, will now be described with reference to FIG. 7. It is assumed in this example that Node 0 is the originator of the message and that the multicast proceeds in the same manner as described in conjunction with FIG. 5, except that at some point prior to time d, Node 12 fails. At time d, Node 8 has not yet received a confirmation back from Node 12, and therefore assumes that it has failed. At time e, Node 8 sends a copy of the message to the successor of Node 12, which is Node 13. Included with the message is the tag [0], which indicates to Node 13 that it is responsible for the nodes between itself and Node 0, excluding Node 0 (i.e. itself and Nodes 14 and 15). Node 13 divides up its region of responsibility between Nodes $(13+16/2^4)$ and $[13+16/(2^{4-1})]$—in other words, Nodes 14 and 15. At time f, Node 13 sends an acknowledgement to Node 8, indicating that it received Node 8's message. Also at time f, Node 13 sends a copy of the message each to Nodes 14 and 15. The message to Node 14 includes the tag [15], indicating that Node 14 is responsible for sending copies of the message to the nodes between itself and Node 15, excluding Node 15 (the result being that Node 14 is only responsible for itself). Similarly, the message to Node 15 includes the tag [0], indicating that Node 15 is responsible for sending copies of the message to the nodes between itself and Node 0, excluding Node 0 (again, the result being that Node 15 is only responsible for itself). At time g, Nodes 14 and 15 each send respective acknowledgement messages and confirmation messages indicating that they've received the copies of the original message multicast by Node 0 and have fulfilled their forwarding responsibilities. Furthermore, Node 13 sends a confirmation message back to Node 8, indicating that is has successfully sent copies of the message to one level of child nodes below it. Also at time g, Node 8 sends a confirmation message to Node 0 indicating that it has successfully sent copies of the message to one level of child nodes below it. Finally, at time h, Node 13 sends a message to Node 8, confirming that it has successfully sent a copy of the message to one level of child nodes below it.

While there are many possible implementations of the Copy-N-Deep method that has just been described, an example of a Copy-N-Deep implementation in which N=1 is expressed in pseudo code as follows:

```
Broadcast(information)
{
    BroadcastToRegion(information, null, my_address)
}
BroadcastToRegion(information, sender, end_address)
```

-continued

```
{
    if (sender != null) Send ack reply message back to sender;
    Deliver information to ourselves;
    nodesSentTo = null;
    nodesThatAcked = null;
    foreach finger table entry e do {
        if (end_address == my_address || e.address between start_address -> my_address and
            end_address)
            {
                send to e.node message:
                    "Do BroadcastToRegion(
                        information,
                        my_Address,
                        min(next finger table.address, end_address))";
                while (send failed) // deal with sender-side message failure.
                    resend to successor(e.address);
                nodesSentTo = nodesSentTo + node that message was sent to;
            }
    }
    while (nodesSentTo != null || nodesThatAcked != null) {
        wait for an ack message, a 1-Deep reply message or a message timeout;
        if (ack message) {
            nodesSentTo = nodesSentTo − node from which ack received;
            nodesThatAcked = nodesThatAcked + node from which
                message received;
        } else
        if (1-Deep reply message) {
            nodesThatAcked = nodesThatAcked − node from which
                ack received;
        } else if (timeout on Ack message)
            nodesSentTo = nodesSentTo − node for which ack reply
                timed out;
            resend timed out message to successor(node for which
                ack reply timed out);
            nodesSentTo = nodesSentTo + successor(node for which
                ack reply timed out);
        } else
        {/* timeout on 1-Deep message */
            nodesThatAcked = nodesThatAcked − node for which
                reply timed out;
            resend timed out message to successor(node for which
                reply timed out);
            nodesSentTo = nodesSentTo + successor(node for which
                reply timed out);
        }
    }
    if (sender != null)
    {
        send a 1-Deep reply to sender saying that we have contacted all the nodes we are
        delegating to;
    }
}
```

Overlapping-N

Another method for enabling nodes of a multicast group to recover from failure according to an embodiment of the invention will now be described. In this method, referred to herein as "Overlapping-N," each node in the multicast group is responsible for ensuring that N of its "right-hand" siblings (siblings to the right of it in the tree) have done their jobs. Accordingly, each node not only knows what its own area of responsibility is, but also knows the area of responsibility of N of its right-hand siblings. This information is supplied to each node by the node's parent in the multicast tree. If the siblings for which the node is responsible fail, then the node or one of its descendants sends the appropriate messages to the successors of the failed nodes, indicating that the successor nodes should assume the responsibilities of the failed nodes. The responsibilities of the various nodes in the Overlapping-N method may be delegated to other nodes.

For example, in an Overlapping-1 implementation that uses the multicast tree of FIG. 3c, Node 2 has knowledge of Node 4's area of responsibility (in addition to having knowledge of its own area of responsibility), is responsible for periodically checking for the purpose of determining whether Node 4 is alive, and is responsible for declaring Node 4 to be dead if Node 4 fails to respond by the end of a timeout period. Furthermore, if Node 4 dies (i.e. fails in such a way that it cannot perform its job in the context of the multicast tree), Node 2 is responsible for making sure that Node 4's responsibilities are carried out. Note, however, that Node 2 does not necessarily have to perform all of the tasks that are required to carry out these responsibilities. In this example, Node 2 delegates this responsibility to Node 3. Node 3 periodically queries Node 4. If Node 4 fails to respond to these queries, then Node 3 assumes that Node 4 has failed, and transmits a message to Node 5 indicating that Node 5 should take over the task of disseminating information to all nodes between itself (Node 5) and Node 8. The message transmitted from Node 3 to Node 5 includes an indication of what Node 5's new responsibilities are.

Figure 8:
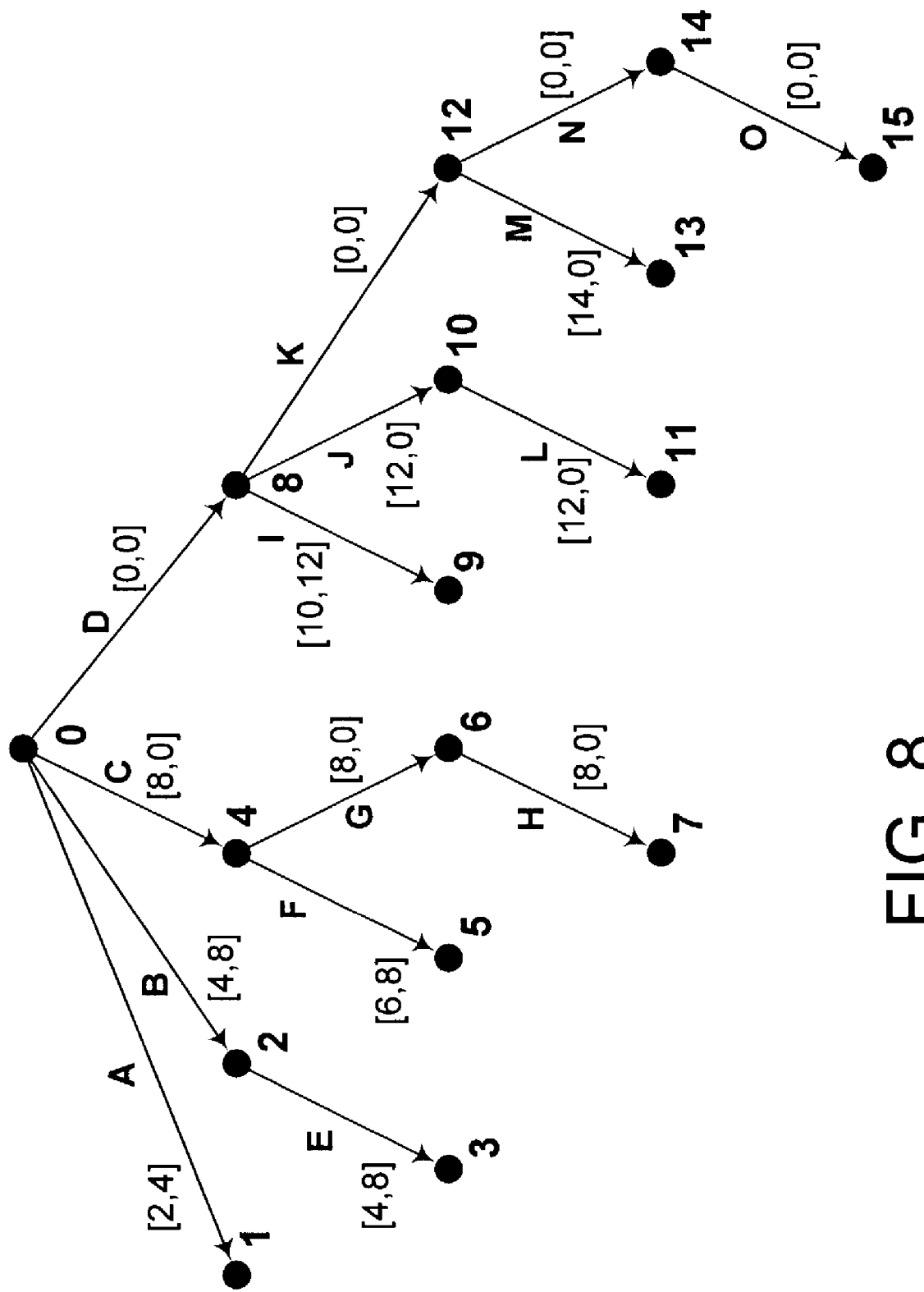
FIG. 8 illustrates how responsibility for failure recovery is divided up among the members of the multicast group according to an Overlapping-N embodiment of the invention, in which N=1.

To illustrate how responsibility for failure recovery is divided up among the members of the multicast group according to an Overlapping-N embodiment of the invention, reference is made to the multicast tree of FIG. 8, in which N=1. The bracketed numbers represent tags that are included in messages sent from parent nodes to child nodes. The first number in each tag represents the upper (rightmost) boundary of the receiving node's area of responsibility, excluding the boundary itself. The second digit represents the upper boundary of the area of responsibility of the receiving node's sibling to the right of it—again, excluding the boundary itself. As in the previous examples, it is assumed that Node 0 is the originator of the multicast message.

Referring to FIG. 8, the copy of the message that Node 0 sends to Node 1 (Arrow A) includes the tag [2,4], indicating that Node 1 is responsible for ensuring that copies of the message are sent to all nodes between itself (Node 1) and Node 2, excluding Node 2, that it is responsible for ensuring that periodic queries are made to Node 2 for the purpose of determining whether Node 2 is alive, and that it is responsible for declaring Node 2 to be dead if Node 2 fails to respond by the end of a timeout period. The second digit of tag [2,4] indicates that Node 2 is responsible for ensuring that copies of the message are sent to all nodes between itself and Node 4, excluding Node 4. Should Node 2 fail, Node 1 is responsible for ensuring that a successor to Node 2 is found, and that the successor is informed of Node 2's area of responsibility. The tags for the rest of the messages transmitted by Node 0 are summarized as follows: Node 2 receives the tag [4,8] (Arrow B), indicating that it has responsibility for ensuring that copies of the message are sent to all nodes between itself and Node 4, excluding Node 4, that it is responsible for ensuring that periodic queries are made to Node 4 for the purpose of determining whether Node 4 is still alive, that it is responsible for ensuring that Node 4 is declared to be dead if Node 4 fails to respond by the end of a timeout period, and that Node 4 is responsible for ensuring that copies of the message are sent to all nodes between itself and Node 8, excluding Node 8. Node 4 receives the tag [8,0] (Arrow C), indicating that it is responsible for ensuring that copies of the message are sent to all nodes between itself and Node 8, excluding Node 8, that it is responsible for ensuring that periodic queries are made to Node 8 to see if Node 8 is still alive, that it is responsible for ensuring that Node 8 is declared to be dead if Node 8 fails to respond by the end of a timeout period, and that Node 8 is responsible for ensuring that copies of the message are sent to all nodes between it and Node 0, excluding Node 0. Finally, Node 8 receives the tag [0,0] (Arrow D), indicating that it has responsibility for ensuring that copies of the message are sent to all nodes between itself and Node 0, excluding Node 0. The message also indicates that Node 8 is responsible for ensuring that periodic queries are made to Node 0 for the purpose of determining whether Node 0 is still alive, that it is responsible for ensuring that Node 0 is declared to be dead if Node 0 fails to respond by the end of a timeout period, and that Node 0 is responsible for sending copies to all other nodes between itself and Node 0 (which includes all nodes of the multicast group, since the numbering system being used is circular).

Continuing with the example of FIG. 8, Node 2 transmits a copy of the multicast message to Node 3 (Arrow E) along with the tag [4,8], indicating to Node 3 that Node 3 is responsible for ensuring that copies of the message are sent to all nodes between itself and Node 4, excluding Node 4 (it just needs to deliver the message to itself, in this case), that it is responsible for ensuring that periodic queries are made to Node 4 to verify that Node 4 is still alive, that it is responsible for ensuring that Node 4 is declared to be dead if Node 4 fails to respond by the end of a timeout period, and that Node 4 is responsible for ensuring that copies of the message are sent to all nodes between itself and Node 8, excluding Node 8. Thus, Node 2 has delegated the responsibility for querying Node 4 to Node 3. Since Node 3 has no child nodes, Node 3 will end up performing the periodic queries to Node 4 itself. Node 4 transmits a copy of the multicast message that includes the tag [6,8] to Node 5 (Arrow F), indicating to Node 5 that Node 5 is responsible for ensuring that copies of the message are sent to all nodes between itself and Node 6, excluding Node 6 (it just needs to deliver the message to itself, in this case), that it is responsible for ensuring that periodic queries are sent to Node 6 for the purpose of determining whether Node 6 is still alive, that it is responsible for ensuring that Node 6 is declared to be dead if Node 6 fails to respond by the end of a timeout period, and that Node 6 is responsible for ensuring that copies of the message are sent to all nodes between itself and Node 8, excluding Node 8. Since Node 6 has no child nodes, Node 5 will end up performing the periodic queries to Node 6 itself. Node 4 also transmits a copy of the multicast message that includes the tag [8,0] to Node 6 (Arrow G), indicating to Node 6 that Node 6 is responsible for ensuring that copies of the message are sent to all nodes between itself and Node 8, excluding Node 8 (itself and Node 7, in this case), that it is responsible for ensuring that periodic queries are sent to Node 8 for the purpose of determining whether Node 8 is still alive, that it is responsible for ensuring that Node 8 is declared to be dead if Node 8 fails to respond by the end of a timeout period, and that Node 8 is responsible for ensuring that copies of the message are sent to all nodes between itself and Node 0, excluding Node 0. Thus, Node 4 has delegated the responsibility for checking on Node 8 to Node 6.

The tags for the messages transmitted by Node 8 are summarized as follows: the message to Node 9 (Arrow I) includes the tag [10,12], indicating that Node 9 is responsible for ensuring that copies of the message are sent to all nodes between itself and Node 10, excluding Node 10 (it just needs to deliver the message to itself, in this case), that it is responsible for ensuring that periodic queries are made to Node 10 for the purpose of determining whether Node 10 is still alive, that it is responsible for ensuring that Node 10 is declared to be dead if Node 10 fails to respond by the end of a timeout period, and that Node 10 is responsible for ensuring that copies of the message are sent to all nodes between itself and Node 12. Since Node 9 has no child nodes, Node 9 will end up performing the periodic queries to Node 10 itself. The message to Node 10 (Arrow J) includes the tag [12,0], indicating that Node 10 is responsible for ensuring that copies of the message are sent to all nodes between itself and Node 12, excluding Node 12 (itself and Node 11, in this case), that it is responsible for ensuring that periodic queries are sent to Node 12 for the purpose of determining whether Node 12 is alive, that it is responsible for ensuring that Node 12 is declared to be dead if Node 12 fails to respond by the end of a timeout period, and that Node 12 is responsible for ensuring that copies of the message are sent to all nodes between itself and Node 0, excluding Node 0. Finally, the message to Node 12 (Arrow K) includes the tag [0,0], indicating that Node 12 is responsible for ensuring that copies of the message are sent to all nodes between itself and Node 0, excluding Node 0 (it just needs to deliver the message to itself, in this case). The message also indicates that Node 12 is responsible for ensuring that periodic queries are made to Node 0 for the purpose of determining whether Node 0 is still alive, that it is responsible for ensuring that Node 0 is declared to be dead if Node 0 fails to respond by the end of a timeout period, and that Node 0 is responsible for sending copies to all other nodes between itself and Node 0 (which includes all nodes of the multicast group, since the numbering system being used is circular). Thus, Node 8 has delegated its responsibility for querying Node 0 to Node 12.

The tags for the messages transmitted by Node 6, Node 10, Node 12 and Node 14 are summarized as follows: The message sent by Node 6 to Node 7 (Arrow H) includes the tag [8,0], indicating that Node 7 is responsible for ensuring that copies of the message are sent to all nodes between itself and Node 8, excluding Node 8 (it just has to deliver the message to itself, in this case), that it is responsible for ensuring that periodic queries are sent to Node 8 for the purpose of determining whether Node 8 is still alive, that it is responsible for ensuring that Node 8 is declared to be dead if Node 8 fails to respond by the end of a timeout period, and that Node 8 is responsible for ensuring that copies of the message are sent to all nodes between itself and Node 0, excluding Node 0. Thus, Node 6 has delegated the responsibility for querying Node 8 to Node 7. Since Node 7 has no child nodes, Node 7 will end up performing the periodic queries to Node 8 itself. The message sent by Node 10 to Node 11 (Arrow L) includes the tag [12,0], indicating that Node 11 is responsible for ensuring that copies of the message are sent to all nodes between itself and Node 12, excluding Node 12 (it just has to deliver the message to itself, in this case), that it is responsible for ensuring that periodic queries are sent to Node 12 for the purpose of determining whether Node 12 is still alive, that it is responsible for ensuring that Node 12 is declared to be dead if Node 12 fails to respond by the end of a timeout period, and that Node 12 is responsible for ensuring that copies of the message are sent to all nodes between itself and Node 0, excluding Node 0. Thus, Node 10 has delegated the responsibility for querying Node 12 to Node 11. Since Node 11 has no child nodes, Node 11 will end up performing the periodic queries to Node 12 itself. The message sent by Node 12 to Node 13 (Arrow M) includes the tag [14,0], indicating that Node 13 is responsible for ensuring that copies of the message are sent to all nodes between itself and Node 14, excluding Node 14 (it just has to deliver the message to itself, in this case), that it is responsible for ensuring that queries are sent to Node 14 for the purpose of determining whether Node 14 is alive, that it is responsible for ensuring that Node 14 is declared to be dead if Node 14 fails to respond by the end of a timeout period, and that Node 14 is responsible for ensuring that copies of the message are sent to all nodes between itself and Node 0, excluding Node 0. Since Node 13 has no child nodes, Node 13 will end up performing the periodic queries to Node 14 itself. The message sent by node 12 to Node 14 (Arrow N) includes the tag [0,0], indicating that Node 14 is responsible for ensuring that copies of the message are sent to all nodes between itself and Node 0, excluding Node 0. The message also indicates that Node 14 is responsible for ensuring that periodic queries are made to Node 0 for the purpose of determining whether Node 0 is still alive, that it is responsible for ensuring that Node 0 is declared to be dead if Node 0 fails to respond by the end of a timeout period, and that Node 0 is responsible for sending copies to all other nodes between itself and Node 0 (which includes all nodes of the multicast group, since the numbering system being used is circular). Thus, Node 12 has delegated its responsibility for querying Node 0 to Node 14. Finally, the message sent by Node 14 to Node 15 (Arrow O) includes the tag [0,0], indicating that Node 15 is responsible for ensuring that copies of the message are sent to all nodes between itself and Node 0 (it just has to deliver the message to itself, in this case). The message also indicates that Node 15 is responsible for ensuring that periodic queries are made to Node 0 for the purpose of determining whether Node 0 is still alive, that it is responsible for ensuring that Node 0 is declared to be dead if Node 0 fails to respond by the end of a timeout period, and that Node 0 is responsible for sending copies to all other nodes between itself and Node 0 (which includes all nodes of the multicast group, since the numbering system being used is circular). Thus, Node 14 has delegated its responsibility for querying Node 0 to Node 15. Since Node 15 has no child nodes, Node 15 will end up performing the periodic queries to Node 0 itself.

Figure 9:
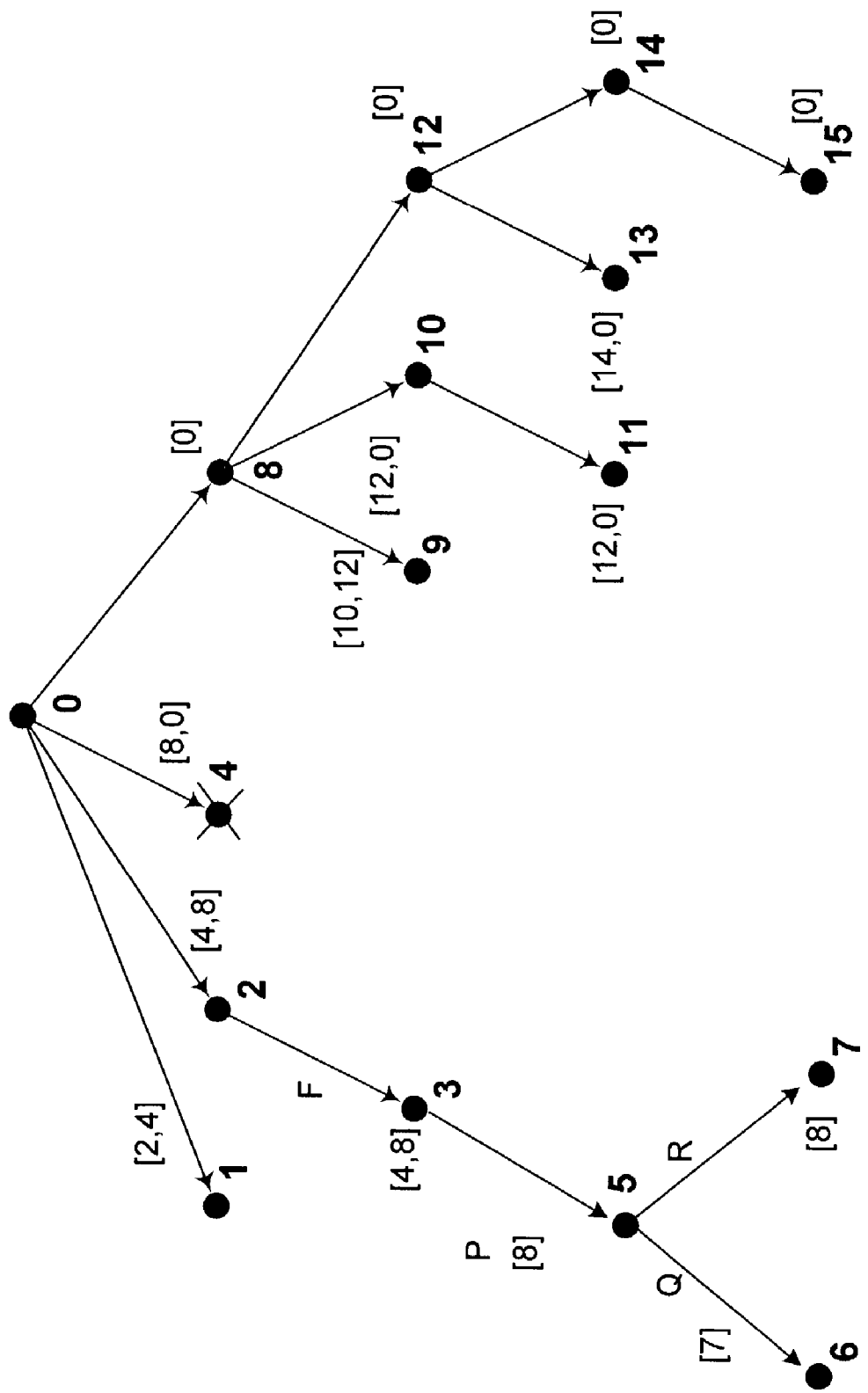
FIG. 9 illustrates an example of how the Overlapping-N method handles a failure, using the multicast tree of FIG. 8.

Referring to FIG. 9, an example of how the Overlapping-N method handles a failure will now be described, using the multicast tree of FIG. 8. It is assumed in this example that Node 4 fails, and that Node 3 discovers the failure after it has received its copy of the message from Node 2. Once Node 3 has determined that Node 4 is not functioning properly (by, for example, failing to receive a response to a periodic query), Node 3 transmits a copy of the multicast message to Node 5 (Arrow P), the successor to Node 4. The message sent by Node 3 to Node 5 includes the tag [8], which indicates to Node 5 that Node 5 is responsible for ensuring that copies of the message are sent to all nodes between itself and Node 8, excluding Node 8 (itself and Nodes 6 and 7). Node 5 creates a new sub-tree based on its new area of responsibility. This new sub-tree includes Node 6 and Node 7, as shown in FIG. 9. Node 5 then transmits a copy of the message to Node 6 (Arrow Q) that includes the tag [7], indicating to Node 6 that Node 6 is responsible for ensuring that copies of the message are sent to each node between itself and Node 7 (it just has to deliver the message to itself, in this case). Node 5 also transmits a copy of the message to Node 7 (Arrow R) that includes the tag [8], indicating to Node 7 that Node 7 is responsible for ensuring that a copy of the message is sent to each node between itself and Node 8, excluding Node 8 (it just has to deliver the message to itself, in this case).

While there are many possible implementations of the Overlapping-N method that has just been described, an example of an Overlapping-N implementation, in which N=1, is expressed in pseudo code as shown below. Note that this pseudo code example assumes that finger tables end with an entry that points at the node on which a given finger table resides, and that all finger table entries beyond that entry are "null." Thus, for example, the finger table for Node 0 should have the entries [1, 2, 3, 8, 0, null, null, . . . ]. Similarly, the finger table for Node 1 should have the entries [2, 3, 5, 9, 1, null, . . . ].

```
Broadcast(information)
{
    BroadcastToRegion(information, my_address, my_address)
}
BroadcastToRegion(information, end_address, next_end)
{
Deliver information to ourselves;
```

-continued

```
Int count = 0;
    foreach finger table entry e do {
        if (end_address == my_address || e.address between my_address and end_address)
        {
        count++;
        if (next finger table address >= end_address) new_next_end = next_end;
        else new_next_end = next next finger table address; // note that this value may be null.
        send to e.node message:
            "Do BroadcastToRegion(
                information,
                next finger table address,
                new_next_end)";
        while (send failed)
            resend to successor(e.address);
        }
        if count == 0 && next_end != null then
            send message to successor(end_address):
                "Do ConfirmRegion(information, next_end)";
}
ConfirmRegion(information, end_address)
{
    if already received information return;
    BroadcastToRegion(information, end_address, null);
}
```

Verify Rightward

Another method for transmitting a message to the members of a multicast group according to an embodiment of the invention will now be described. This method, referred to herein as "Verify Rightward," is a generalization of the Overlapping-N method previously described. Each node in the multicast tree knows the area of responsibility of all of its right-hand siblings. This information is supplied to each node by its parent in the multicast tree. If one or more nodes fail, then messages will be generated to indicate that the successor nodes should assume the responsibilities of the failed nodes. For example, in a Verify Rightward implementation that uses the multicast tree of FIG. 10, Node 2 is responsible for making sure that Node 4 has done its job, and has knowledge of Node 4's area of responsibility and Node 8's area of responsibility, as well as knowledge of its own area of responsibility.

Figure 10:
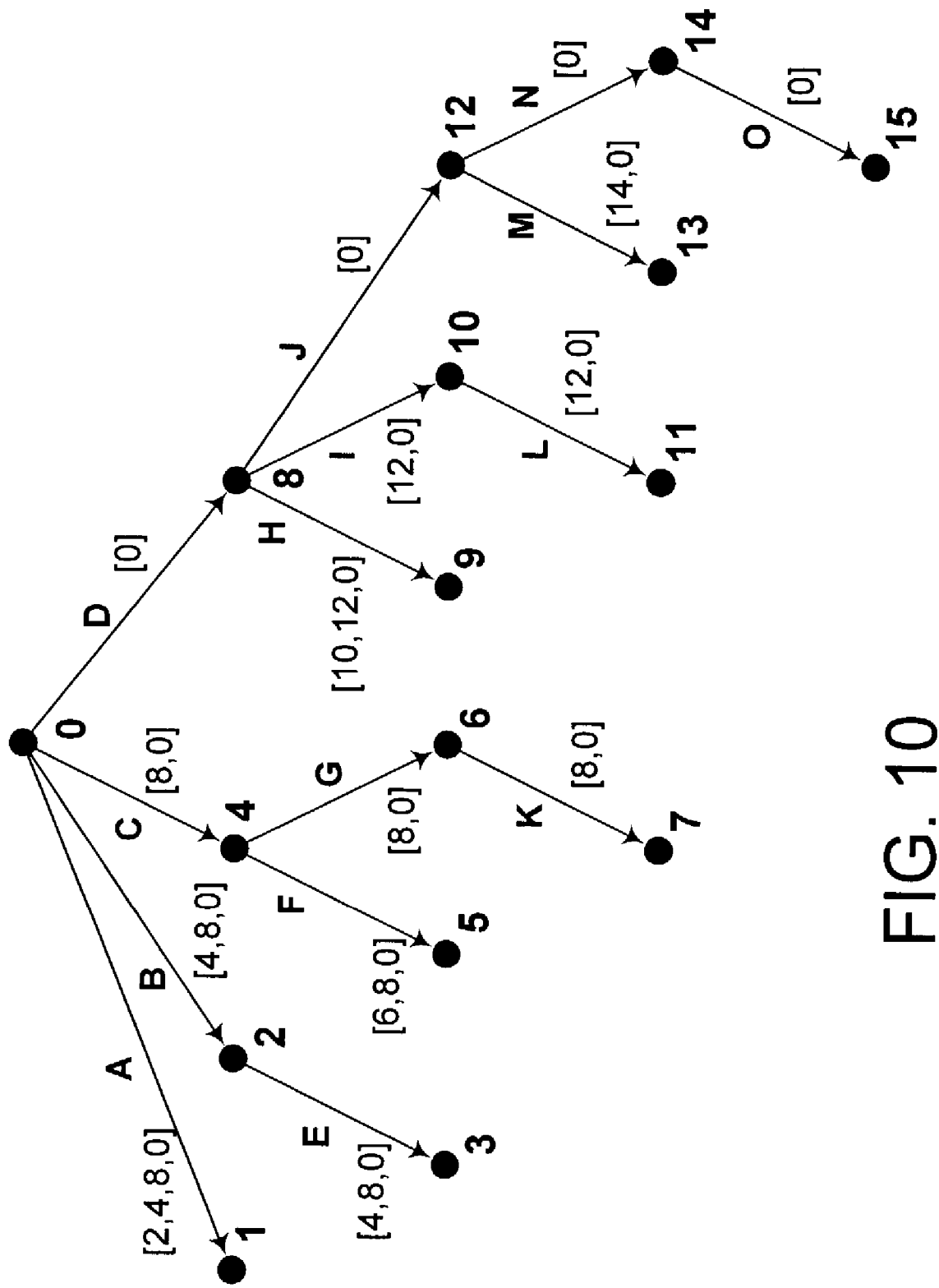
FIG. 10 illustrates how responsibility for failure recovery is divided up among the members of the multicast group according to a Verify Rightward embodiment of the invention.

To illustrate how responsibility for failure recovery is divided up among the members of a multicast group according to a Verify Rightward embodiment of the invention, reference is made to the multicast tree of FIG. 10. The bracketed numbers represent tags that are included in messages sent from parent nodes to child nodes. The first number in each tag represents the upper (rightmost) boundary of the receiving node's area of responsibility. The receiving node's area of responsibility excludes the boundary itself. Each subsequent digit represents (a) a sibling to the right of the receiving node and/or (b) the upper boundary of the area of responsibility of the node whose number immediately precedes the digit. Additionally, unless the tag contains only a single element, a node receiving a message with a tag is responsible for ensuring that the node whose number appears in the first field of the tag is queried for the purpose of determining whether the queried node is alive. As in the Overlapping-N method, a node may delegate this responsibility to child nodes, if it has any.

For example, Node 0 sends Node 1 a copy of a multicast message that includes the tag [2,4,8,0]. This indicates to Node 1: (a) that Node 1 is responsible for ensuring that copies of the message are sent to all nodes between it and Node 2, excluding Node 2; (b) that Node 1 is responsible for ensuring that Node 2 is queried for the purpose of determining whether Node 2 is alive and for ensuring that Node 2 is declared to be dead if Node 2 fails to respond by the end of a timeout period; (c) that Node 2's area of responsibility has an upper boundary of 4, excluding 4; (d) that Node 4's area of responsibility has an upper boundary of 8, excluding 8; and (e) that Node 8's area of responsibility has an upper boundary of 0, excluding 0.

Continuing with the example of FIG. 10, the rest of the copies of the multicast message are sent to the various nodes of the multicast tree as described in Table 1:

TABLE 1

| From Node | To Node | Tag | Arrow | Meaning |
|---|---|---|---|---|
| Node 0 | Node 1 | [2, 4, 8, 0] | A | * Node 1 is responsible for delivering copies of the message to all nodes between it and Node 2, excluding Node 2<br>* Node 1 needs to periodically query Node 2 for the purpose of determining whether Node 2 is alive and needs to declare Node 2 to be dead if Node 2 fails to respond by the end of a timeout period<br>* Node 2's area of responsibility has an upper boundary of 4, excluding 4<br>* Node 4's area of responsibility has an upper boundary of 8, excluding 8<br>* Node 8's area of responsibility has an upper boundary of 0, excluding 0 |

TABLE 1-continued

| From Node | To Node | Tag | Arrow | Meaning |
|---|---|---|---|---|
| Node 0 | Node 2 | [4, 8, 0] | B | * Node 2 is responsible for delivering copies of the message to all nodes between it and Node 4, excluding Node 4<br>* Node 2 is responsible for ensuring that Node 4 gets periodically queried for the purpose of determining whether Node 4 is still alive, and is responsible for ensuring that Node 4 is declared to be dead if Node 4 fails to respond by the end of a timeout period<br>* Node 4's area of responsibility has an upper boundary of 8, excluding 8<br>* Node 8's area of responsibility has an upper boundary of 0, excluding 0 |
| Node 0 | Node 4 | [8, 0] | C | * Node 4 is responsible for delivering copies of the message to all nodes between it and Node 8, excluding Node 8<br>* Node 4 is responsible for ensuring that Node 8 gets periodically queried for the purpose of determining whether Node 8 is still alive, and is responsible for ensuring that Node 8 is declared to be dead if Node 8 fails to respond by the end of a timeout period<br>* Node 8's area of responsibility has an upper boundary of 0, excluding 0 |
| Node 0 | Node 8 | [0] | D | * Node 8 is responsible for delivering copies of the message to all nodes between it and Node 0, excluding Node 0<br>* Node 8 needs to periodically query Node 0 for the purpose of determining whether Node 0 is alive and needs to declare Node 0 to be dead if Node 0 fails to respond by the end of a timeout period<br>* Node 8's area of responsibility has an upper boundary of 0, excluding 0 |
| Node 2 | Node 3 | [4, 8, 0] | E | * Node 3 is responsible for delivering copies of the message to all nodes between it and Node 4.<br>* Node 3 needs to periodically query Node 4 for the purpose of determining whether Node 4 is alive and needs to declare Node 4 to be dead if Node 4 fails to respond by the end of a timeout period<br>* Node 4's area of responsibility has an upper boundary of 8, excluding 8<br>* Node 8's area of responsibility has an upper boundary of 0, excluding 0 |
| Node 4 | Node 5 | [6, 8, 0] | F | * Node 5 is responsible for delivering copies of the message to all nodes between it and Node 6, excluding Node 6.<br>* Node 5 needs to periodically query Node 6 for the purpose of determining whether Node 6 is alive and needs to declare Node 6 to be dead if Node 6 fails to respond by the end of a timeout period<br>* Node 6's area of responsibility has an upper boundary of 8, excluding 8<br>* Node 8's area of responsibility has an upper boundary of 0, excluding 8 |
| Node 4 | Node 6 | [8, 0] | G | * Node 6 is responsible for delivering copies of the message to all nodes between it and Node 8, excluding Node 8<br>* Node 6 is responsible for ensuring that Node 8 gets periodically queried for the purpose of determining whether Node 8 is still alive, and is responsible for ensuring that Node 8 is declared to be dead if Node 8 fails to respond by the end of a timeout period<br>* Node 8's area of responsibility has an upper boundary of 0, excluding 0 |
| Node 8 | Node 9 | [10, 12, 0] | H | * Node 9 is responsible for delivering copies of the message to all nodes between it and Node 10.<br>* Node 9 needs to periodically query Node 10 for the purpose of determining whether Node 10 is alive, and needs to declare Node 10 to be dead if Node 10 fails to respond by the end of a timeout period<br>* Node 10's area of responsibility has an upper boundary of 12, excluding 12<br>* Node 12's area of responsibility has an upper boundary of 0, excluding 0 |
| Node 8 | Node 10 | [12, 0] | I | * Node 10 is responsible for delivering copies of the message to all nodes between it and Node 12, excluding Node 12.<br>* Node 10 is responsible for ensuring that Node 12 gets periodically queried for the purpose of determining whether Node 12 is still alive, and is responsible for ensuring that Node 12 is declared to be dead if Node 12 fails to respond by the end of a timeout period<br>* Node 12's area of responsibility has an upper boundary of 0, excluding 0 |

TABLE 1-continued

| From Node | To Node | Tag | Arrow | Meaning |
|---|---|---|---|---|
| Node 8 | Node 12 | [0] | J | * Node 12 is responsible for delivering copies of the message to all nodes between it and Node 0, excluding Node 0<br>* Node 12 is responsible for ensuring that Node 0 gets periodically queried for the purpose of determining whether Node 0 is still alive, and is responsible for ensuring that Node 0 is declared to be dead if Node 0 fails to respond by the end of a timeout period |
| Node 6 | Node 7 | [8, 0] | K | * Node 7 is responsible for delivering copies of the message to all nodes between it and Node 8, excluding Node 8<br>* Node 7 needs to periodically query Node 8 for the purpose of determining whether Node 8 is alive and needs to declare Node 8 to be dead if Node 8 fails to respond by the end of a timeout period<br>* Node 8's area of responsibility has an upper boundary of 0, excluding 0 |
| Node 10 | Node 11 | [12, 0] | L | * Node 11 is responsible for delivering copies of the message to all nodes between it and Node 12, excluding Node 12<br>* Node 11 needs to periodically query Node 12 for the purpose of determining whether Node 12 is alive and needs to declare Node 12 to be dead if Node 12 fails to respond by the end of a timeout period<br>* Node 12's area of responsibility has an upper boundary of 0, excluding 0 |
| Node 12 | Node 13 | [14, 0] | M | * Node 13 is responsible for delivering copies of the message to all nodes between it and Node 14, excluding Node 14<br>* Node 13 needs to periodically query Node 14 for the purpose of determining whether Node 14 is alive and needs to declare Node 14 to be dead if Node 14 fails to respond by the end of a timeout period<br>* Node 14's area of responsibility has an upper boundary of 0, excluding 0 |
| Node 12 | Node 14 | [0] | N | * Node 14 is responsible for delivering copies of the message to all nodes between it and Node 0, excluding Node 0<br>* Node 14 is responsible for ensuring that Node 0 gets periodically queried for the purpose of determining whether Node 0 is still alive, and is responsible for ensuring that Node 0 is declared to be dead if Node 0 fails to respond by the end of a timeout period |
| Node 14 | Node 15 | [0] | O | * Node 15 is responsible for delivering copies of the message to all nodes between it and Node 0, excluding Node 0<br>* Node 15 needs to periodically query Node 0 for the purpose of determining whether Node 0 is alive and needs to declare Node 0 to be dead if Node 0 fails to respond by the end of a timeout period |

Figure 11:
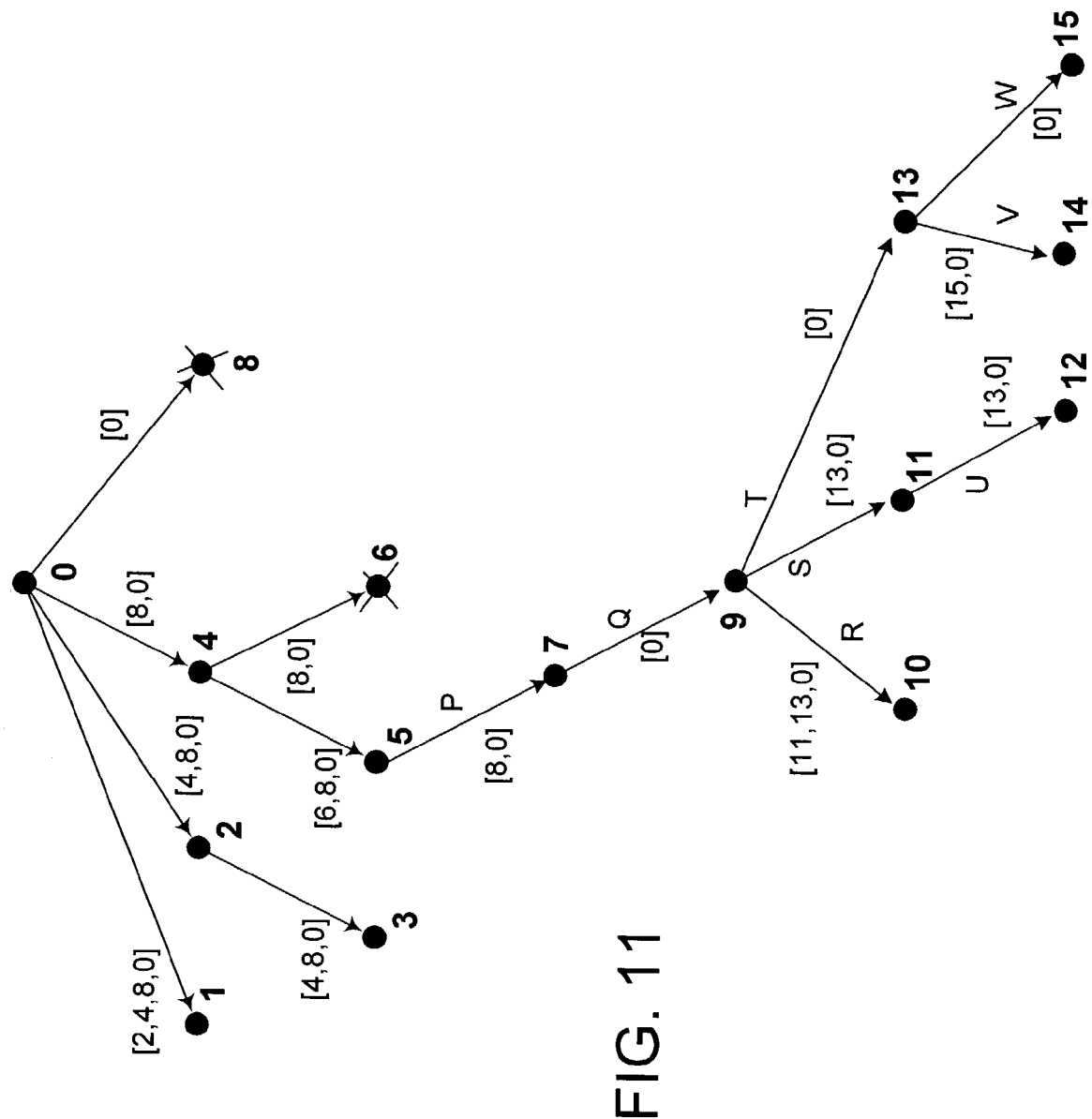
FIG. 11 illustrates an example of how the Verify Rightward method handles multiple faults.

An example of how the Verify Rightward method handles multiple faults will now be described with reference to FIGS. 10 and 11. It is assumed in this example that the multicast tree of FIG. 10 is being used, but that Nodes 6 and 8 have failed. The dissemination of the multicast message proceeds normally through the dissemination tree to Nodes 1, 2, 3, 4 and 5. After Node 5 receives its copy of the message, it queries Node 6 to determine whether Node 6 is still alive. After waiting for the appropriate interval without receiving a response from Node 6, Node 5 concludes that Node 6 is not alive, and creates a new branch in the multicast tree to Node 7, which is Node 6's successor. Node 5 then transmits a copy of the multicast message to Node 7 (Arrow P), along with the tag [8,0], which is a truncated version of the tag Node 5 had received from Node 4. The tag [8,0] has all of the information that Node 7 needs to assume Node 6's duties—namely, it includes the upper boundary of the range of nodes to which Node 6 is supposed to ensure that copies of the message are sent. Furthermore, the tag [8,0] also includes the information that Node 7 needs to periodically query Node 8 for the purpose of determining whether Node 8 is alive, and needs to declare Node 8 to be dead if Node 8 fails to answer by the end of a timeout period.

After receiving the multicast message from Node 5, Node 7 queries Node 8. After waiting the appropriate interval without receiving a response from Node 8, Node 7 concludes that Node 8 is not alive, and creates a new branch in the multicast tree to Node 9, which is Node 8's successor. Node 7 then transmits a copy of the message to Node 9 (Arrow Q), along with the tag [0], which is a truncated version of the tag Node 7 received from Node 5. The tag [0] also includes the information that Node 9 needs to perform Node 8's duties—namely, that the upper boundary of the range of nodes to which Node 8 was responsible for ensuring delivery of the message is Node 0. The message also indicates that Node 9 is responsible for ensuring that Node 0 is periodically queried for the purpose of determining whether Node 0 is alive, and is responsible for ensuring that Node 0 is declared to be dead if it fails to answer by the end of a timeout period.

Node 9 then divides its region of responsibility between Node 10, Node 11 and Node 13, creating a new sub-tree in the process. To Node 10, it sends a copy of the message (Arrow R), along with the tag [11, 13, 0], indicating that Node 10 is responsible for ensuring that copies of the message are sent to all nodes between itself and Node 11 (i.e. no nodes except itself), that it needs to periodically query Node 11 to determine whether Node 11 is alive, that it needs to declare Node 11 to be dead if it fails to answer by the end of a timeout period, and that its two "rightward" siblings have responsibilities that end at Nodes 13 and 0. Node 9 also sends a copy of the message to Node 11 (Arrow S) with the tag [13,0], indicating that Node 11 is responsible for ensuring that copies of the message are sent to all nodes between itself and Node 13, excluding Node 13, that Node 11 is responsible for ensuring that Node 13 is periodically queried for the purpose of determining whether Node 13 is alive, that it is responsible for ensuring that Node 13 is declared to be dead if it fails to answer by the end of a timeout period, and that Node 13 is responsible for ensuring that copies of the message are sent to all nodes between it and Node 0, excluding Node 0. Finally, Node 9 also sends a copy of the message to Node 13 (Arrow T) with the tag [0], indicating that Node 13 is responsible for ensuring that copies of the message are sent to all nodes between itself and Node 0, excluding Node 0, that Node 13 is responsible for ensuring that Node 0 is periodically queried for the purpose of determining whether Node 0 is alive, and that Node 13 is responsible for ensuring that Node 0 is declared to be dead if it fails to answer by the end of a timeout period.

The messages sent to Nodes 12, 14 and 15 (Arrows U, V and W) by Nodes 11 and 13 are as follows: the message sent from Node 11 to Node 12 includes the tag [13,0], indicating that Node 12 is responsible for ensuring that copies of the message are sent to all nodes between itself and Node 13, excluding Node 13, that Node 12 is responsible for periodically querying Node 13 to determine whether Node 13 is alive, that Node 12 is responsible for declaring Node 13 to be dead if it fails to answer by the end of a timeout period, and that Node 13 is responsible for ensuring that copies of the message are sent to all nodes between it and Node 0, excluding Node 0. The message sent to Node 14 by Node 13 includes the tag [15, 0], indicating that Node 14 is responsible for ensuring that copies of the message are sent to all nodes between itself and Node 15, excluding Node 15, that Node 14 needs to periodically query Node 15 to determine whether Node 15 is alive, that Node 14 needs to declare Node 15 to be dead if it fails to answer by the end of a timeout period, and that Node 15 is responsible for ensuring that copies of the message are sent to all nodes between it and Node 0, excluding Node 0. Finally, the message sent from Node 13 to Node 15 includes the tag [0], indicating that Node 15 is responsible for ensuring that copies of the message are sent to all nodes between itself and Node 0, excluding Node 0, that Node 15 needs to periodically query Node 0 to determine whether Node 15 is alive, and that Node 15 needs to declare Node 0 to be dead if it fails to answer by the end of a timeout period.

An example of how a Verify Rightward implementation would handle the failure of the root node will now be described. It is assumed in this example that Node 0 (FIG. 10) transmits a multicast message to Nodes 2, 4, 8 but fails before transmitting the message to Node 1. Node 15, after receiving a copy of the multicast message with the tag [0] checks its successor node, Node 0, and finds that Node 0 has failed. Node 15 would, therefore, transmit the message to Node 1 with the tag [0], indicating that Node 1 is responsible for getting the message to all nodes between itself and Node 0, excluding Node 0. In this case, Node 1 would be responsible for getting the message to all other nodes in the multicast group. The message would, in effect, be re-disseminated to the entire group, starting from Node 1.

While there are many possible implementations of the Verify Rightward method that has just been described, an example of a Verify Rightward implementation, expressed in pseudo code, is as follows:

```
// Description of a key field in a message:
Message:
{
    ... // other fields.
    NodeID [ ] destinationIdentifierList; // An array of destination node ids
}
Processing at a Node upon receiving a message:
NodeID [ ] usefulFingerPointers; // finger pointers to which the message has to be
                                 // forwarded
Remove all elements of destinationIdentifierList that are less-than-or-equal-to my_address;
count = 0;
// Now populate the usefulFingerPointers array
for(int i = 0; i < fingerTable.Length; i++)
{
    if(fingerPointer[i] is between my_address and destinationIdentifierList[First Element]
        usefulFingerPointers[count++] = fingerPointer[i];
}
if(count = = 0)
{ // there are no fingerPointers between the current node and the last destination
        // identifier.
        Query the successor if it has received the message.
            If it did not receive any message then
                {
                    if destinationIdentfierList has more than one element then
                    {
                        Remove first element of destinationIdentifierList;
                    }
                    Send message to successor;
                }
}
else
{
        for(j=0; j<usefulFingerPointers.Length; j++)
        {
```

-continued

```
        Prepend to the list of destination identifiers in the message the subarray of usefulFingerPointers
            from j+1 to usefulFingerPointers.Length − 1;
        Send message to usefulFingerPointer[j];
        }
    }
}
```

Full Path Information

According to those embodiments of the invention that use the Full Path Information method, leaf nodes (nodes that don't have children) of the multicast tree, and non-leaf nodes (nodes with children) whose successor node is also a non-leaf node, check to see whether their successor node has failed and, if so, take over responsibility for doing the failed node's dissemination work. Note that if a leaf node fails then there is no dissemination work that needs to be picked up by another node.

If a node's successor node is determined to have failed, the node relies on the network's routing capabilities to forward its own multicast message to the next non-failed successor node after the failed one(s). This node, then determines what dissemination responsibilities it has in order to make up for the failed node(s). The relevant responsibilities can be computed if multicast messages contain a modified history of the nodes they have traversed through the multicast tree.

In accordance with those embodiments that use the Full Path Information method, each node characterizes its area of responsibility in terms of "zones." The boundaries of each zone are defined by the finger pointers within that zone's area of responsibility. To reiterate, a nodes finger pointers are determined according to the following pattern: given a multicast group of S nodes, and given that $p=\log_2(S)$, each Node n (i.e. each node that is numbered some arbitrary number n) has finger pointers to Node $[(n+S/2^p) \bmod S]$ Node $\{[n+S/(2^{p-1})] \bmod S\}$, Node $\{[n+S/(2^{p-2})] \bmod S\}$ . . . , and Node $[(n+S/2) \bmod S]$. For example, in the 16-node multicast group previously described and shown, for example, in FIGS. 3a–3c and FIG. 4, if Node 0 wishes to transmit a multicast message to the rest of the nodes, it divides up responsibility for forwarding copies of the message among Nodes 1, 2, 4 and 8. When conceptualized as "zones," this division of responsibility can be expressed as described in Table 2:

TABLE 2

| Zone number | Range |
|---|---|
| 0 | [0–1) |
| 1 | [1–2) |
| 2 | [2–4) |
| 3 | [4–8) |
| 4 | [8–15] |

The zones into which Node 4 divides responsibility can similarly be characterized as described in Table 3:

TABLE 3

| Zone number | Range |
|---|---|
| 0 | [4–5) |
| 1 | [5–6) |
| 2 | [6–8] |

The zones into which Node 6 divides responsibility can similarly be characterized as described in Table 4:

TABLE 4

| Zone number | Range |
|---|---|
| 0 | [6–7) |
| 1 | [7–8] |

And so on.

Figure 12:
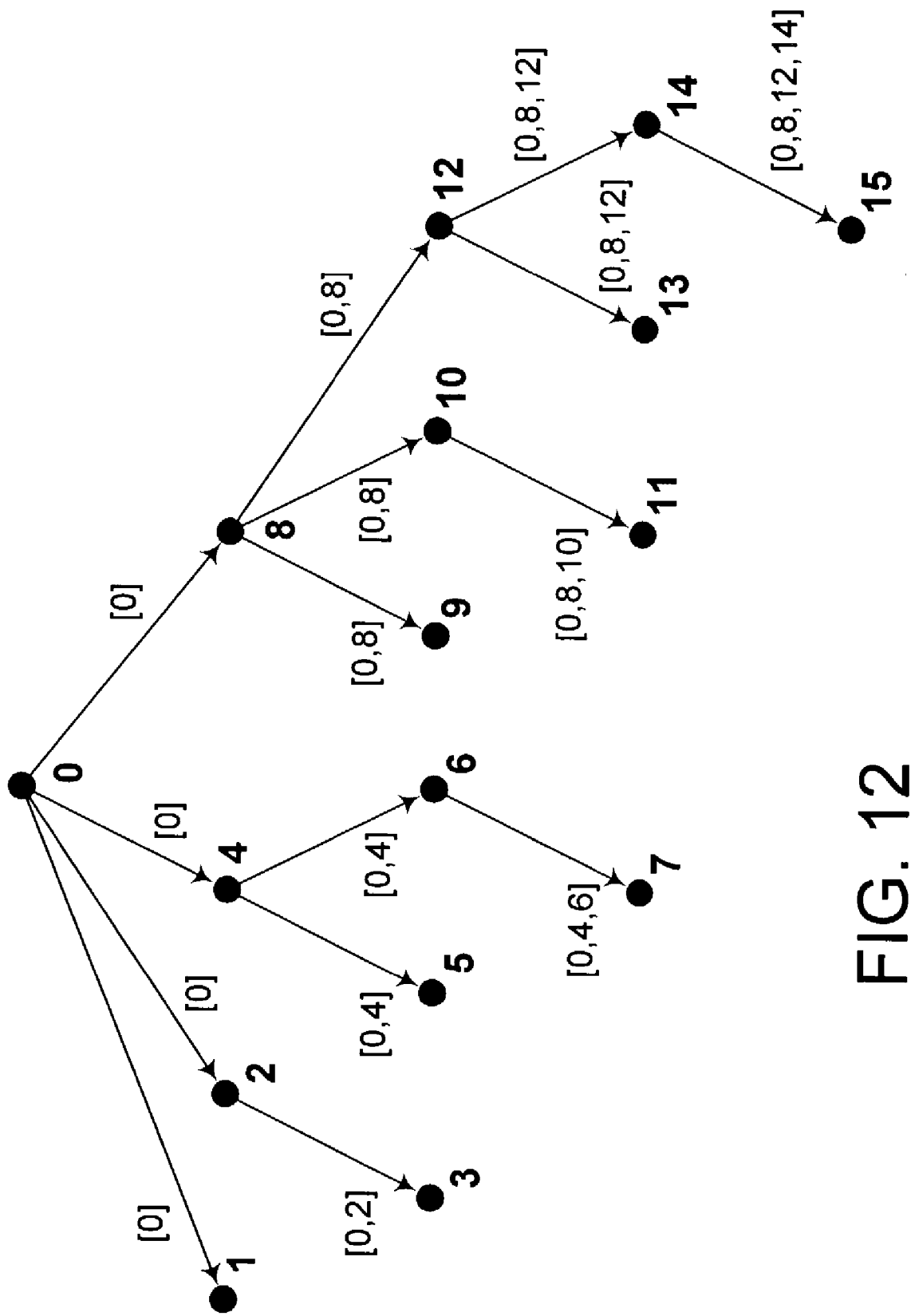
FIG. 12 shows an example of a history created for a message sent according to a Full Path Information embodiment of the invention.

Each multicast message, as it makes it way through the multicast group, carries a "history" of node numbers of the nodes through which it passes. FIG. 12 shows an example of this history for a group of 16 nodes for a message originating at node 0.

When a message is received by a node "n," the node first looks at the history included with the received message to determine whether it is a message that has arrived by the normal, failure-free dissemination route or one that has arrived by means of forwarding past one or more failed successor nodes of a leaf node. Let the history of the message be n1, n2, n3 . . . np. Starting from n1, the Node n checks for the first node in the sequence with respect to which the nodes n−1 and n lie in different zones. The failure-free case will be when np is the only node that is in a different zone than n. If an earlier node in the history is in a different zone, then Node n determines that it is dealing with the failed-node case. Let that first node that was found to be in a different zone be denoted by nr. The Node n then truncates the history sequence at nr. Thus, the sequence would be n1, n2, n3 . . . nr.

The node then computes the address range to which this message must be disseminated by it. The starting point for the range is itself and the end point is referred to as the "destination identifier," which the node computes. For this purpose, it computes the end points of the zone in which it lies for each of the nodes in its truncated history, and takes the minimum of the endpoints as the destination identifier. It attaches its identifier to the history. It then transmits the messages to all of its finger pointers lying between itself and the destination identifier. If none of the finger pointers lie within the destination identifier (which includes the successor), then the node is a leaf node and it sends a query message to its successor node asking if that node has received a multicast message. If it is not received then the message is sent.

While there are many possible implementations of the Overlapping-N method that has just been described, an example of a Full Path Information implementation, expressed in pseudo code, is as follows:

First Operation—Determine what Modifications that the Receiving Node Makes to the History in Order to Create the Tags that Get Sent to Other Nodes Along with the Multicast Message:

Definitions:

Zone(id, NodeId): Returns the zone number to which the id belongs with respect to Node having the ID NodeId. Zone is a rightopen left closed interval. For example consider a multicast group organized as a ring of 16 nodes with identifiers 0–15 respectively. For node "0" the zones are [0–1), [1–2), [2–4), [4–8), [8–15). for ex: Zone(6,0)=3, Zone(3,0)=2, Zone(0, 0)=0.

Zone(id, NodeId).endPoint is the upper boundary node for Zone(id, NodeId.) For example, Zone(6,0).endPoint=8; Zone(3,0).endPoint=4; and Zone(0,0).endPoint=1;

for (i=0; i<Message.history.Length; i++)
{
   if (Zone(currentNodeID, Message.history[i])!=Zone (Message.Predecessor, Message.history[i]) break;
}
// If the loop breaks before the last element it indicates a "boundary crossing",
// which implies an error recovery
Message.history=first i+1 elements of Message.history+currentNodeID;
//Note that the loop always breaks, at least on the last iteration.

Second Operation—Compute the "Destination Identifier."
for (j=0; j<i; j++)
   endPointArray[j]=Zone.(currentNodeID, Message.history[j]).endPoint;
DestinationIdentifier=min of the all the elements in endPointArray;

Third Operation—Send Copies of the Multicast Message to Nodes Listed in the Finger Pointer Table
for all (fingerPointers<DestinationIdentifier)
{
   send message (with modified History);
}

Fourth Operation—Determine Whether to Query Successor Node
if (nofingerPointers<DestinationIdentifier or successor nodeID is a non-leaf node id)
{
   Query if the successor received Message.
   If successor never received message, send message (with modified history).
   // Note this is the boundary querying case.
}

For example, to disseminate a message that was multicast from Node 0 of the multicast group of FIG. 12, the various nodes each perform the first, second, third and fourth operations described above, and end up with the following results, that are illustrated in FIG. 12 and described in Table 5:

TABLE 5

| Node | Tag received | Tag sent | Nodes to which a copy of the message is sent |
|---|---|---|---|
| 0 | none | [0] | 1, 2, 4 and 8 |
| 1 | [0] | none | none |
| 2 | [0] | [0, 2] | 3 |
| 3 | [0, 2] | none | none |
| 4 | [0] | [0, 4] | 5 and 6 |
| 5 | [0, 4] | none | none |
| 6 | [0, 4] | [0, 4, 6] | 7 |
| 7 | [0, 4, 6] | none | none |
| 8 | [0] | [0, 8] | 9, 10 and 12 |
| 9 | [0, 8] | none | none |
| 10 | [0, 8] | [0, 8, 10] | 11 |
| 11 | [0, 8, 10] | none | none |
| 12 | [0, 8] | [0, 8, 12] | 13 and 14 |
| 13 | [0, 8, 12] | none | none |
| 14 | [0, 8, 12] | [0, 8, 12, 14] | 15 |
| 15 | [0, 8, 12, 14] | none | none |

TABLE 5-continued

An example of how Node 6 of FIG. 12 processes its copy of the multicast message will now be described. As shown in FIG. 12 and in described in the above table, Node 6 receives a copy of the multicast message along with the history tag [0,4]. It then performs the first operation:
   CurrentNodeID=6
   Message.Predecessor=4
   Message.history.length=2
   First iteration
     i=0
     Message.history[0]=0
     Zone(6, 0)=Zone(4, 0)=3
     so no break
     i++
   Second iteration
     i=1
     Message.history[1]=4
     Zone(6, 4)=2
     Zone(4, 4)=0
     Zone(6, 4)!=Zone(4, 4)
     so break Tag sent by Node 6 includes all of the elements of the received tag up to and including Message.history[i], plus Node 6's ID ("6"). Thus, the tag comprises [0,4,6]

Node 6 then performs the second operation as follows:
   i=1 from first operation
   First iteration
     j=0
     endPointArray[0]=Zone(6,0).endpoint=8
     j++
   Second iteration
     j=1=i
     so break
   endPointArray has only one element->endPointArray[0], which is 8
   DestinationIdentifier=min of all the elements in endPointArray=8

Node 6 then performs the third operation as follows:
Node 6 has finger pointers to Nodes 7, 8, 10, and 14.
The only Node in this list whose NodeId is less than 8 (the DestinationID) is Node 7
So Node 6 sends a copy of the multicast message to Node 7, along with the tag [0,4,6]
Node 6 then performs the fourth operation as follows:
Node 6 has finger pointers that are less than the DestinationID.
Also, its successor node, Node 7, is one of its leaf nodes. Thus neither of the conditions specified in this operation are fulfilled, so the operation ends with no query being made to the successor node An example of how a failure at Nodes 6 and 8 is handled will now be described, with reference to FIG. 13.

Node 5 is assumed to have received a message with the tag [0,4] (also referred to as Message.history). Node 5 performs the following operations:

First operation: Modified Message.history=tag=tag[0,4,5]. Note that id 5 is added to tag[0,4]
Second Operation: Destination Identifier=6.
Third Operation: No message sent to anyone as Destination Identifier is less than or equal to all finger pointers of 5.
Fourth Operation: Checks with successor node 7 whether if it received the message. Node 7 responds negatively.
Fifth Operation: sends a message to node 7 with tag [0,4,5]

Node 7 is assumed to have received the message with the tag [0,4,5] (also referred to as Message.history). Node 7 performs the following operations:
First Operation: Modified Message.history=tag=tag[0,4,7]. Note that id 5 is pruned and id 7 is added to tag [0,4,5].
Second Operation: Destination Identifier=8.
Third Operation: No message sent to anyone as Destination Identifier is less than all finger pointers of 7.
Fourth Operation: Checks with successor node 9 whether if it received the message. Node 9 responds negatively.
Fifth Operation: sends a message to node 9 with tag [0,4,7]

Node 9 is assumed to have received the message with the tag [0,4,7] (also referred to as Message.history). Node 9 performs the following operations:
First Operation: Modified Message.history=tag=tag[0,9]. Note that ids 4 and 7 are pruned and id 9 is added to tag[0,4,7]
Second Operation: Destination Identifier=0.
Third Operation: Messages sent to all finger pointers of 9 less than 0 i.e., 10, 11, and 13 (Note the less than is a circular operation, hence 0 is equivalent to 16). The messages are sent with the tag [0,9].
Fourth Operation: Nothing to be done here as there are finger pointers of 9 less than destination identifier.
Fifth Operation: Sends a message to nodes 10, 11 and 13 with tag [0,9]

It can thus be seen that a new a useful method for multicasting a message in a computer network has been provided. In view of the many possible embodiments to which the principles of this invention may be applied, it should be recognized that the embodiments described herein with respect to the drawing figures is meant to be illustrative only and should not be taken as limiting the scope of invention. For example, those of skill in the art will recognize that the elements of the illustrated embodiments shown in software may be implemented in hardware and vice versa or that the illustrated embodiments can be modified in arrangement and detail without departing from the spirit of the invention. Therefore, the invention as described herein contemplates all such embodiments as may come within the scope of the following claims and equivalents thereof.

What is claimed is:

1. A method for disseminating a message to nodes of a multicast group, the multicast group being organized into a tree-structured hierarchy, the method comprising:
transmitting the multicast message from a node of the multicast group to a plurality of other nodes of the multicast group, wherein each node has an identification number that is an integer;
transmitting, along with the multicast message:
an indication of the responsibility that each node of the plurality of other nodes has with respect to disseminating the multicast message further down the multicast tree; and
an indication of how responsibilities are to be divided up among the nodes of the multicast group should one or more of the nodes of the multicast group fail;
wherein the transmitting step comprises transmitting, to a receiving node, a tag comprising a first identification number of a node that represents a boundary of the receiving node's area of responsibility, the identification number being usable to route messages to the node, the area of responsibility being the range of nodes to which the receiving node is responsible for further disseminating the message, and a second identification number of a node that represents a boundary of the area of responsibility of an additional node, other than the receiving node, the area of responsibility being the range of nodes to which the additional node is responsible for further disseminating the message.

2. A computer-readable storage medium having stored thereon computer-executable instructions for performing the method claim 1.

3. The method of claim 1, further comprising:
receiving the tag;
detecting that a node of the multicast group has failed;
identifying a node of the multicast group as a successor node to the failed node; and
transmitting to the successor node an indication of the successor node's area of responsibility based on the received tag.

4. A method for disseminating a message to nodes of a multicast group, the method comprising:
at a first node of the multicast group:
delegating responsibility for forwarding the message to a first plurality of other nodes of the multicast group, wherein each node of the multicast group has a node number;
transmitting to a second node of the multicast group, the second node being one of the first plurality of nodes, information about the responsibility delegated to the second node, wherein the information identifies a second plurality of other nodes of the multicast group, the second plurality comprising nodes to which the second node is responsible for ensuring the message is sent, the responsibility information further identifies a boundary of nodes for which the second node is responsible for ensuring that copies of the message are sent, and the responsibility information is a boundary node number of one of the nodes of the multicast group and indicates that the second node is responsible for insuring that all nodes with node numbers that are between its own and the boundary node number receive the message;
determining whether an indication that the second node has fulfilled at least some of its responsibility has been received; and
based on the determining step, transmitting, to a third node of the multicast group, the information about the responsibility delegated to the second node, so that the third node can assume the responsibility of the second node.

5. A computer-readable storage medium having stored thereon computer-executable instructions for performing the method of claim 4.

6. The method of claim 4, further comprising transmitting the multicast message to the second node.

7. The method of claim 4, further comprising:
at the second node, determining whether the third node has failed; and
based on the determining step, transmitting the information about the responsibility of a third node to a successor node of the third node, thereby allowing the successor node to fulfill the responsibility of the third node.

8. A method for disseminating a message to nodes of a multicast group, the method comprising:

at a first node of the multicast group:

delegating responsibility for forwarding the message to a first plurality of other nodes of the multicast group;

transmitting to a second node of the multicast group, the second node being one of the first plurality of nodes, information regarding the responsibility delegated to the second node, wherein the information identifies a second plurality of other nodes of the multicast group, the second plurality comprising nodes to which the second node is responsible for ensuring the message is sent, and the information about the responsibility further identifies a node at the boundary of the second node's responsibility;

transmitting to the second node information about the responsibility of a third node of the multicast group, wherein the third node is one of the first plurality of nodes, thereby allowing the second node to initiate recovery of the multicast group should the third node fail;

at the second node:

dividing up responsibility for forwarding the message among nodes whose node numbers are between the first node's node number and the number of the node at the boundary of the second node's responsibility;

determining whether the third node has failed; and based on the determining step, transmitting the information about the responsibility of the third node to a successor node of the third node, thereby allowing the successor node to fulfill the responsibility of the third node.

9. A computer-readable storage medium having stored thereon computer-readable executable instructions for performing the method of claim 8.

10. The method of claim 8, further comprising transmitting the multicast message to the second node.

11. The method of claim 8, wherein each node of the multicast group has a node number, and the information about the responsibility delegated to the second node is a boundary node number of one of the nodes of the multicast group and indicates that the second node is responsible for insuring that all nodes with node numbers that are between its own number and the boundary node number receive the message.

12. A method for disseminating a message to nodes of a multicast group, wherein each node has an identification number that is an integer, the method comprising:

a node of the multicast group receiving a multicast message that includes information that identifies previous nodes of the multicast group through which the message has passed prior to being received, wherein the information further comprises a tag comprising a first identification number of a node that represents a boundary of the receiving node's area of responsibility, the identification number being usable to route messages to the node, the area of responsibility being the range of nodes to which the receiving node is responsible for further disseminating the message, and a second identification number of a node that represents a boundary of the area of responsibility of an additional node, other than the receiving node, the area of responsibility being the range of nodes to which the additional node is responsible for further disseminating the message;

the receiving node deriving, based on the information received with the multicast message, the identity of the nodes of the multicast group to which the receiving node is responsible for sending the message; and the receiving node transmitting, based on the deriving step, the multicast message to the nodes to which the receiving node is responsible for sending the message.

13. A computer-readable storage medium having stored thereon computer-readable executable instructions for performing the method of claim 12.

14. The method of claim 12, further comprising: the receiving node determining, based on the information in the multicast message, whether any other nodes of the multicast group have failed, wherein the deriving step is based at least in part on the determining step.

15. A method for multicasting a message to a plurality of computer nodes of a multicast tree, each of the plurality of computer nodes having a node ID, the method comprising:

a first node of the plurality of nodes transmitting at least a tag and a copy of the message to a second node of the plurality of nodes, wherein the tag comprises the node ID of a third node of the plurality of nodes, the third node being a sibling of the second node within the multicast tree;

the second node interpreting the tag as indicating that the second node is responsible for ensuring that a copy of the message is sent to each node of the plurality of nodes whose node ID is between the second node's node ID and the node ID of the third node, not including the third node;

the second node sending a copy of the message to at least one of its descendent nodes of the multicast tree;

the second node determining that it has successfully transmitted a copy of the message to a certain number of levels of its descendent nodes in the multicast tree; and the second node transmitting a confirmation to the first node to indicate that it has successfully transmitted a copy of the message to the certain number of levels of its descendent nodes in the multicast tree.

16. The method of claim 15, further comprising:

the second node determining that it has successfully transmitted a copy of the message to its descendent nodes at least two levels down in the multicast tree; and the second node transmitting a confirmation to the first node to indicate that it has successfully transmitted a copy of the message to its descendent nodes at least two levels down in the multicast tree.

17. A method for multicasting a message to a plurality of compute nodes of a multicast tree, each of the plurality of computer nodes having a node ID, the method comprising:

a first node of the plurality of nodes transmitting at least a tag and a copy of the message to a second node of the plurality of nodes, wherein the tag comprises the node ID of a third node of the plurality of nodes and the node ID of a fourth node of the plurality of nodes, the third node and the fourth node each being a sibling of the second node within the multicast tree, the tag further comprises the node ID of at least one other node in addition to the third node, and wherein the second node interprets the tag as additionally indicating that the second node is responsible for ensuring that a copy of the message is sent to additional nodes up to, but not including, the other node; and the second node interpreting the tag as indicating that the second node is responsible for ensuring that a copy of the message is sent to each node of the plurality of nodes whose node ID is between the second node's node ID and the node ID of the third node, not including the third node;

that the second node is responsible for ensuring that the third node is periodically queried to determine whether the third node is alive, and that the third node is responsible for ensuring that a copy of the message is sent to each node of the plurality of nodes whose node ID is between the third node's node ID and the node ID of the fourth node, not including the fourth node.

* * * * *